US005387832A

United States Patent [19]

Tanaka et al.

[11] Patent Number: 5,387,832

[45] Date of Patent: Feb. 7, 1995

[54] BRUSH AND COMMUTATOR MOTOR HAVING BRUSH DEVICE USING THE SAME

[75] Inventors: Motoyuki Tanaka, Tokyo; Yasunori Hatano, Hiratsuka; Tadashi Ozawa, Hadano; Tatsuya Ikegami, Machida; Hiroyuki Yoshizawa, Ebina, all of Japan

[73] Assignee: Tokyo Electric Co., Ltd., Tokyo, Japan

[21] Appl. No.: 872,790

[22] Filed: Apr. 22, 1992

[30] Foreign Application Priority Data

| | | | |
|---|---|---|---|
| Apr. 25, 1991 | [JP] | Japan | 3-095563 |
| Jul. 29, 1991 | [JP] | Japan | 3-188940 |
| Jul. 29, 1991 | [JP] | Japan | 3-188941 |
| Aug. 28, 1991 | [JP] | Japan | 3-215723 |
| Sep. 30, 1991 | [JP] | Japan | 3-251014 |
| Oct. 3, 1991 | [JP] | Japan | 3-281857 |
| Dec. 24, 1991 | [JP] | Japan | 3-340534 |
| Jan. 30, 1992 | [JP] | Japan | 3-015045 |
| Jan. 31, 1992 | [JP] | Japan | 4-015739 |

[51] Int. Cl.[6] H02K 13/00

[52] U.S. Cl. 310/249; 310/44; 310/233; 310/252; 29/597; 29/826

[58] Field of Search 310/220, 221, 248, 249, 310/251, 252, 253, 42, 44, 233, 254, 258, 261; 29/826, 878, 597, 876

[56] References Cited

U.S. PATENT DOCUMENTS

| | | | |
|---|---|---|---|
| 672,449 | 5/1901 | Markey | 310/248 |
| 701,369 | 6/1902 | Mills | 310/248 |
| 2,171,704 | 9/1939 | Koehler | 310/248 |
| 4,415,635 | 11/1983 | Wilsdorf | 310/248 |
| 4,922,149 | 5/1990 | Isozumi | 310/249 |

FOREIGN PATENT DOCUMENTS

| | | | |
|---|---|---|---|
| 705293 | 6/1931 | France . | |
| 2379180 | 8/1978 | France . | |
| 2838144 | 3/1980 | Germany | 310/248 UK |
| 3239003A1 | 4/1984 | Germany . | |
| 8815801 | 4/1989 | Germany | 310/248 |
| 0202135 | 8/1989 | Japan | 310/248 |
| 450538 | 4/1968 | Switzerland . | |
| 0556465 | 10/1943 | United Kingdom | 310/248 |
| 601378 | 5/1944 | United Kingdom . | |
| 1509469 | 5/1978 | United Kingdom | 310/248 |

OTHER PUBLICATIONS

"Ability of Electric Brushes, and How to use the Brushes", Ryuichi Takemasa, Toky Denki Daigaku Press, pp. 160–161, Oct. 10, 1961.

Database WPI, Week 8018, Derwent Publications, Ltd., London, Great Britain, AN 80–31372C (18), & DE-A-2,941,448 (Nihon Kogyo), Abstract.

*Primary Examiner*—R. Skudy

*Attorney, Agent, or Firm*—Frishauf, Holtz, Goodman & Woodward

[57] ABSTRACT

A binded carbon brush includes a brush main portion formed mainly of carbon, and an electric conductor formed by a material, such as a copper powder, having an electric resistivity lower than that of the brush main portion and extending along a main current direction of the brush. In the cross section of the brush perpendicular to the main current direction, the diameter or the vertical and horizontal sizes of the conductor is so set as to be smaller than both the vertical and horizontal sizes of the brush main portion.

25 Claims, 18 Drawing Sheets

BRUSH AND COMMUTATOR MOTOR HAVING BRUSH DEVICE USING THE SAME

BACKGROUND OF THE INVENTION

1. Field of the Invention

The present invention relates to a brush used in an electric generator, a commutator motor, and the like, and slidably contacted with their commutators, and a commutator motor having a brush device using the brush.

2. Description of the Related Art

The brushes used in the commutator motors and the like are roughly classified into carbon type and noble metal type. The carbon type brushes are generally used. The carbon type brush is formed by mixing powdered carbon as a main component with binding material, compressing and solidifying the mixture and sintering the solidified mixture at a high temperature. As the binding material, a synthetic resin is generally used. For example, a conventional brush used for the commutator motor installed in an electric air flower of a vacuum cleaner is composed of one type of carbon as a main component. In order to reduce sparks caused upon slidable contact between brushes and a commutator by increasing the value of resistance commutation, a carbon material as the main component of the conventional brush generally has a high resistance more than 30,000μΩ per square centimeter. Therefore, the value of current short-circuiting be%ween a plurality of commutator segments of the commutator through the brushes is reduced when the commutator segments contact the distal end surface of each brush, so that sparks generated between the brushes and the commutator segments are reduced.

The above-mentioned conventional brush, however, has the following problems. Since the brush has a high total electric resistance (about 0.2Ω) and hence has a high resistance loss of current (about 20 W per one brush), the operation efficiency of the commutator motor using the brushes is decreased.

In addition, since the resistance loss of the current is converted into heat, in the resin binded type brush using the synthetic resin binding material, a heat deterioration of the binding material tends to occur. In the commutator, a synthetic resin portion for insulating the commutator segments from each other is susceptible to the heat deterioration. Especially, the commutator motor used in the electric air flower of the vacuum cleaner tends to decrease in size and increase in input. With this tendency, the current density of the brush is increased. Since the brush has a high electric resistance, it tends to generate a great amount of heat. This shortens the service lives of the brush and the commutator. It is known that the flexural strength of the conventional resin binded type brush is abruptly reduced when its temperature exceeds 200° C.

The service lives of the brush and the commutator can be prolonged if their sizes are increased to reduce the current density and improve heat radiation from their surfaces. With such increases in size, however, the axial length of the commutator motor is increased.

SUMMARY OF THE INVENTION

It is an object of the present invention to provide a motor brush which can reduce the resistance loss of the current and increase its service life as well as the service life of a commutator.

It is another object of the present invention to provide a commutator motor which can decrease its axial length.

In order to achieve the former object, there is provided a brush in which an almost entire portion to be worn by making contact with a commutator, is formed by not less than two types of materials having different electric resistivities and extending along a main current direction thereof, and a diameter or vertical and horizontal sizes of a cross-section of a good conductive portion, formed by a material having the lowest electric resistivity, of the brush in a cross-section of the brush perpendicular to the main current direction is smaller than both vertical and horizontal sizes of a cross-section of a brush main portion, formed by a material having an electric resistivity higher than that of the good conductive portion, of the brush in the cross section.

In order to achieve the latter object of the present invention, there is provided a commutator motor comprising: a stator; a motor case containing the stator; a rotor having a rotor shaft and a commutator fixed to the rotor shaft, arranged inside the stator in the motor case, and rotatably supported by the motor case; and a brush device having a motor brush which is brought into contact with the commutator of the rotor and is supported by the motor case, wherein an almost entire portion of the motor brush, which is to be worn by making contact with the commutator, is formed by not less than two types of materials having different electric resistivities and extending along a main current direction thereof, and a diameter or vertical and horizontal sizes of a cross-section of a good conductive portion, formed of a material having the lowest electric resistivity, of the brush in a cross-section of the brush perpendicular to the main current direction smaller than both vertical and horizontal sizes of a cross-section of a brush main portion, formed by a material having an electric resistivity higher than that of the good conductive portion, of the brush in the cross section.

According to the brush of the present invention having the above-described arrangement, since the diameter or vertical and horizontal sizes of the cross-section of the good conductive portion, formed of a material having a resistivity lower than that of the material of the brush main portion and extending along the main current direction, of the brush in the cross-section of the brush perpendicular to the main current direction is smaller than both vertical and horizontal sizes of a cross-section in the cross section, the total electric resistance of the brush can be reduced. For this reason, since the resistance loss of the current in the brush can be reduced, the amount of heat generated by the brush can be reduced. In addition, since the diameter or the vertical and horizontal sizes of the cross-section of the good conductive portion is smaller than both the vertical and horizontal sizes of the cross-section of the brush main portion, a great decrease in the commutation resistance can be prevented in the brush of the present invention, unlike the case in which the whole brush is formed by a conductor having a low electric resistance. Since the total electric resistance of the brush is low, a material having good contact characteristic with respect to the commutator (i.e., characteristic of keeping contact of the motor brush to the commutator surface) can be used for the brush main portion. Therefore, sparks between the brushes and the commutator can be reduced.

In the motor brush according to the present invention, and having the above-described arrangement, in order to improve the reliability of holding the good conductive portion by the brush main portion, it is preferable that the good conductive portion is arranged in the inner part of the brush main portion.

This structure prevents the good conductive portion from peeling off from the brush main portion due to vibrations and the like generated in the brush when the brush comes into slidable contact with the commutator.

In the brush according to the present invention, and having the above-described arrangement, in order to stabilize the initial performance of the motor brush in the initial stage of use thereof, it is preferable that the brush main portion covers the commutator-side end surface of the good conductive portion in the initial stage of use of the brush.

This structure prevents the brush main portion and the conductor having different physical properties from simultaneously coming into contact with the commutator in the initial stage of use of the brush, during which the brush does not optimally contact the commutator.

In the brush of the present invention having the above-described arrangement, if the brush main portion covers the commutator-side end surface of the good conductive portion in the initial stage of use of the brush, in order to improve the manufacturability of the brush, it is preferable that a hole or a groove extending along the main current direction is formed in the brush main portion, and that the good conductive portion is formed by filling up an electric conductive powder in the hole or the groove.

Since the commutator-side end surface of the good conductive portion is covered by the brush main portion in the initial stage of use of the brush, the hole or the groove formed in the brush main portion has a bottom at its commutator-side end portion along the main current direction in the above described initial stage. This makes the work for filling up the conductive powder into the hole or groove easy.

When the manufacturability of the brush is improved as described above, in order to prevent the conductive powder as the good conductive portion from falling out from the hole or the groove while the brush is used, it is preferable that the conductive powder to be filled up in the hole or the groove in the brush main portion is solidified beforehand in the form of a rod.

In this case, there is no need to perform the work for stamping the conductive powder to harden it after it is filled up in the hole or the groove in the brush main portion. Since the good conductive portion solidified in the form of a rod at a high density has a high strength, it is very rare that the good conductive portion breaks in the hole or the groove by vibrations acting on the brush while the brush is used.

According to the brush of the present invention, in order to prevent the commutator-side end portion of the brush from being damaged by abnormal heat generation, the commutator-side end portion of the good conductive portion can be exposed in the commutator-side end surface of the brush main portion in the initial stage of use of the brush.

With this structure, the commutator-side end surface of the good conductive portion comes into contact with the commutator at the moment when use of the brush starts, and electric current directly flow between the good conductive portion and the commutator, thus preventing abnormal heat generation. In contrast to this, in the case that the commutator-side end surface of the good conductive portion is covered by the brush main portion in the initial stage of use of the brush, electric current concentrates on the commutator-side end surface of the good conductive portion, and the current density is increased. The high-density electric current concentrates in and passes through a part of the brush main portion, located outside of the commutator-side end surface of the good conductive portion and covering the commutator-side end surface. As a result, there is a possibility that the part of the brush main portion, in which electric current concentrates, is abnormally heated.

Since the commutator motor of the present invention, which has the above-described arrangement as a characteristic feature, uses the brush of the above described present invention, the temperatures of the brush and the commutator can be kept low while the motor is used. This allows a decrease in length of the commutator along the axial direction of the motor. Accordingly, the axial length of the commutator motor can be decreased.

As described above, in the brush of the present invention, if the commutator-side end surface of the good conductive portion is covered by the brush main portion, electric current concentrates in the part of the brush main portion, which is located outside of the commutator-side end surface and covers the commutator-side end surface, are that there is a possibility that the part of the brush main portion is heated to a high temperature and is damaged.

In order to eliminate this possibility, according to the brush of the present invention, it is preferable that a resistance means having any electric resistivity higher than that of the material of the brush main portion is mounted in the commutator-side end surface of the brush main portion between the commutator-side end surface thereof and the commutator-side end surface of the good conductive portion in the initial stage of use of the brush. The cross-sectional area of the resistance means perpendicular to the main current direction is almost equal to or larger than the cross-sectional area of the commutator-side end portion of the good conductive portion perpendicular to the main current direction, and the resistance means covers the commutator-side end surface of the good conductive portion.

In this structure, electric current flowing to the commutator through the good conductive portion and electric current flowing from the commutator to the good conductive portion are dispersed around the resistance means and pass through the commutator-side end portion of the brush main portion. Therefore, the current density in the commutator-side end portion of the brush main portion is reduced in the initial stage of use of the brush, and a rise in temperature of the commutator-side end portion can be suppressed.

In addition, since direct contact between the commutator-side end surface of the good conductive portion and the commutator can be prevented in the initial stage of use of the brush, the initial performance of the brush in the initial stage of use thereof can be stabilized.

The above-described resistance means is preferably constituted by an air gap. Such a resistance means is easy to form.

In the brush of the present invention, it is possible that a taper hole is formed in the brush main portion to extend along the main current direction and to become narrower toward the commutator-side end surface of the brush main portion, and an electric conductive powder is filled up in the taper hole to constitute the good conductive portion.

In this case, since the powder is gradually pushed toward the pointed distal end of the taper hole by the work for stamping and hardening the conductive powder filled up in the taper hole in the brush main portion, the powder can be sufficiently hardened in the pointed distal end portion of the taper hole. After the initial stage of use of the brush is passed and the good conductive portion is exposed in the distal end surface (commutator-side end surface) of the brush. The taper hole serves as a high resistance against the movement of the conductive powder toward the commutator. Furthermore, since the conductive powder is sufficiently hardened in the taper hole from its proximal end to its distal end, this structure can prevent the powder constructing the good conductive portion from breaking and escaping to the outside through gaps between a plurality of commutator segments due to vibration of the brush caused by slidable contact between the commutator and the brush, thus preventing a decrease in performance of the good conductive portion.

In the brush of the present invention, the good conductive portion may include a lead line composed of a material having a resistivity lower than that of the material of the brush main portion and inserted in a proximal end surface of the brush main portion to extend along the main current direction toward the commutator-side end surface.

In this case, the lead line for the brush can serve as a good conductive portion.

In the brush of the present invention, if the good conductive portion includes the above-described lead line, it is preferable that a hole is formed in the proximal end surface of the brush main portion to have a diameter or vertical and horizontal sizes of its cross-section perpendicular to the main current direction being smaller than both the vertical and horizontal sizes of the cross-section of the brush main portion perpendicular to the main current direction, the lead line is inserted into the brush main portion through the hole, an electric conductive powder having an electric resistivity lower than that of the material of the brush main portion is filled up in the hole, and the hole in the proximal end surface of the brush main portion extends along the conductor to the commutator-side end portion of the lead line.

In this case, since the good conductive portion can be constituted by the lead line and the conductive powder in the hole, the total electric resistance of the brush main portion can be decreased as compared with the case that the good conductive portion is constituted by only one of the lead line and the powder.

With this decrease in electric resistance, the amount of heat generated by the brush main portion can be reduced. In addition, since the diameter or the vertical and horizontal sizes of the cross-section of the good conductive portion is far smaller than the vertical and horizontal sizes of the cross-section of the brush main portion, a great decrease in commutation resistance can be prevented, unlike the case where the entire brush is formed by a low-resistance electric conducting material. Furthermore, since the total electric resistance of the brush is low, a material having good contact characteristic with respect to the commutator (i.e., characteristics of keeping contact between the brush and the commutator surface) can be used for the brush main portion. Therefore, sparks generated between the motor brush and the commutator can be reduced.

The lead line can be formed by twisting a plurality of conductive lines together.

Such a lead line has high flexibility and good fatigue durability.

In the brush of the present invention, it is possible that the good conductive portion has a plurality of elongated conductors, each consisting of a material having an electric resistivity lower than that of the material of the brush main portion, and the plurality of elongated conductors are dispersed in the brush main portion to extend along the main current direction.

In this case, since the plurality of elongated conductors of the good conductive portion are dispersed and embedded inside the brush main portion, the heat radiating characteristic of the brush can be improved. Since a commutator motor using such a brush can reduce the current loss in the brush and the amount of heat generated by the motor brush, the operation efficiency can be increased, and the axial length of the commutator can be decreased. With this reduction in the axial length, the axial length of the commutator motor can be reduced.

In addition, it is more preferable that each of the elongated conductors of the good conductive portion is constructed by forming a powder having an electric resistivity lower than that of the material of the brush main portion into a line shape or a thin plate shape, and that the brush main portion is formed by forming a material having an electric resistivity higher than that of the material of the good conductive portion into a predetermined shape.

With such a structure, the good conductive portion and the brush main portion can be formed in the same manufacturing process.

In the brush of the present invention, if a hole having a diameter or vertical and horizontal sizes of a cross-section perpendicular to the main current direction smaller than both the vertical and horizontal sizes of the cross-section of the brush main portion perpendicular to the main current direction is formed in the proximal end surface of the brush main portion which is opposite to the commutator-side end surface thereof, a lead line composed of a material having the electric resistivity lower than that of the material of the brush main portion is inserted in the brush main portion through the hole, and an electric conductive powder having the electric resistivity lower than that of the material of the brush main portion is filled up in the hole, it is preferable that the proximal end portion of the good conductive portion which is opposite to the commutator-side end portion thereof is continuous with the conductive powder in the hole, the diameter on the vertical and horizontal sizes of the cross-section of the good conductive portion perpendicular to the main current direction is smaller than both the vertical and horizontal sizes of the cross-section of the brush main portion, and the cross-sectional area of the good conductive portion is smaller than that of the hole in the proximal end surface of the brush main portion.

The brush main portion is generally composed of carbon as a main component and hence is mechanically fragile. In addition, since the thickness of the brush main portion is decreased by the good conductive portion arranged in the brush main portion, the strength of the brush main portion is reduced. While the brush is used, its temperature is increased (the temperature of the distal end surface of the brush whose temperature is increased most by slidable contact with the commutator is increased to about 150° to 200° C.). With this increase in temperature, an internal pressure based on the thermal expansion of the good conductive portion acts on the brush main portion owing to the difference in thermal expansion between the good conductive portion and the brush main portion (the thermal expansion coefficient of copper generally used as a material of the good conductive portion is $1.409\times10^{-5}$, and the thermal expansion coefficient of carbon generally used as a main component constituting the brush main portion is $0.118\times10^{-5}$). This internal pressure is increased in proportion to an amount of good conductive portion. Therefore, the internal pressure may become higher than the strength of the brush main portion while the brush is used, resulting in damaging the brush main portion.

In the above-described case, the cross-sectional area of the good conductive portion is set to be smaller than that of the brush main portion so as to ensure the sufficient thickness of the brush main portion, thus preventing a decrease in strength of the brush main portion. Therefore, the influence of the thermal expansion of the good conductive portion on the brush main portion can be reduced.

In this case, it is preferable that the cross-sectional area of the good conductive portion is larger than that of the lead line. This improves the heat radiation characteristics of the good conductive portion.

In the subject matters and various aspects of the present invention described in detail above, it is preferable that the conductor comparing the good conductive portion contains a powder particle having at least one projection which can be deformed when the good conductive portion is thermally expanded or a powder particle having an outer surface plated with a noble metal.

Since such an electric conductive powder is not easily packed at a high density when it is stamped and hardened, gaps are ensured between adjacent powder particles to allow thermal expansion of each particle upon heat generation of the good conductive portion. In addition, when the powder particles expand, their expansion force deforms their projections. Since the expansion energy generated upon heat generation of the good conductive portion is absorbed in the good conductive portion in this manner, the expansion force generated in the good conductive portion and acting on the brush main portion can be reduced.

When the latter electric conductive powder is stamped and hardened to form the good conductive portion, the powder particles are hardened with the plated noble metal on the outer surfaces of the powder particles being in tight contact with each other, so that the conductivity of the good conductive portion can be improved. Therefore, the total electric resistance of the brush can be further decreased to suppress heat generation of the good conductive portion, thus reducing the influence of the thermal expansion of the good conductive portion on the brush main portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Various embodiments of the present invention will be described below with reference to the accompanying drawings.

First Embodiment

Figure 1:
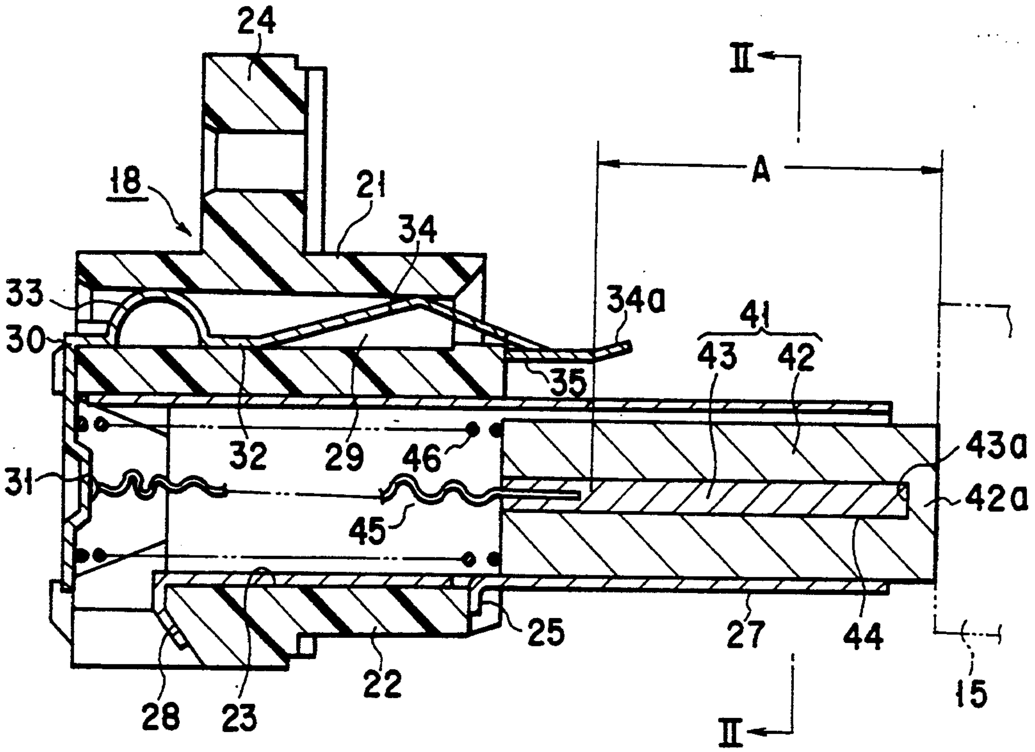
FIG. 1 is a longitudinal sectional view showing a brush device holding a brush according to the first embodiment of the present invention.
Figure 2:
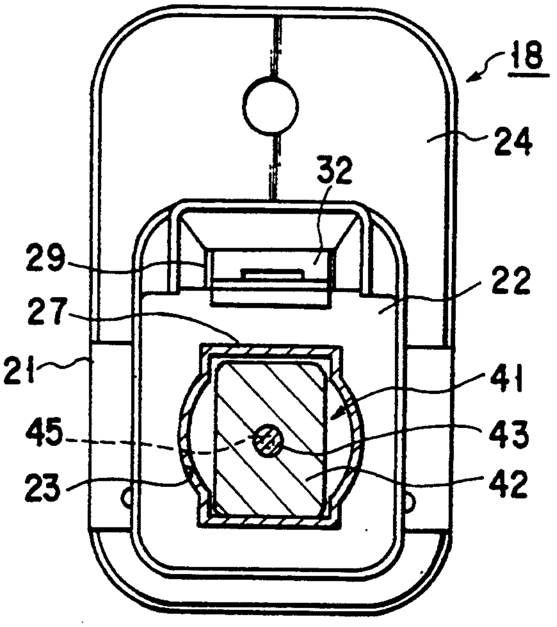
FIG. 2 is a sectional view taken along a line II—II in FIG. 1.

A brush device holding a brush according to the first embodiment of the present invention and an air blower in which the brush device is installed will be described below with reference to FIGS. 1 to 3.

Figure 3:
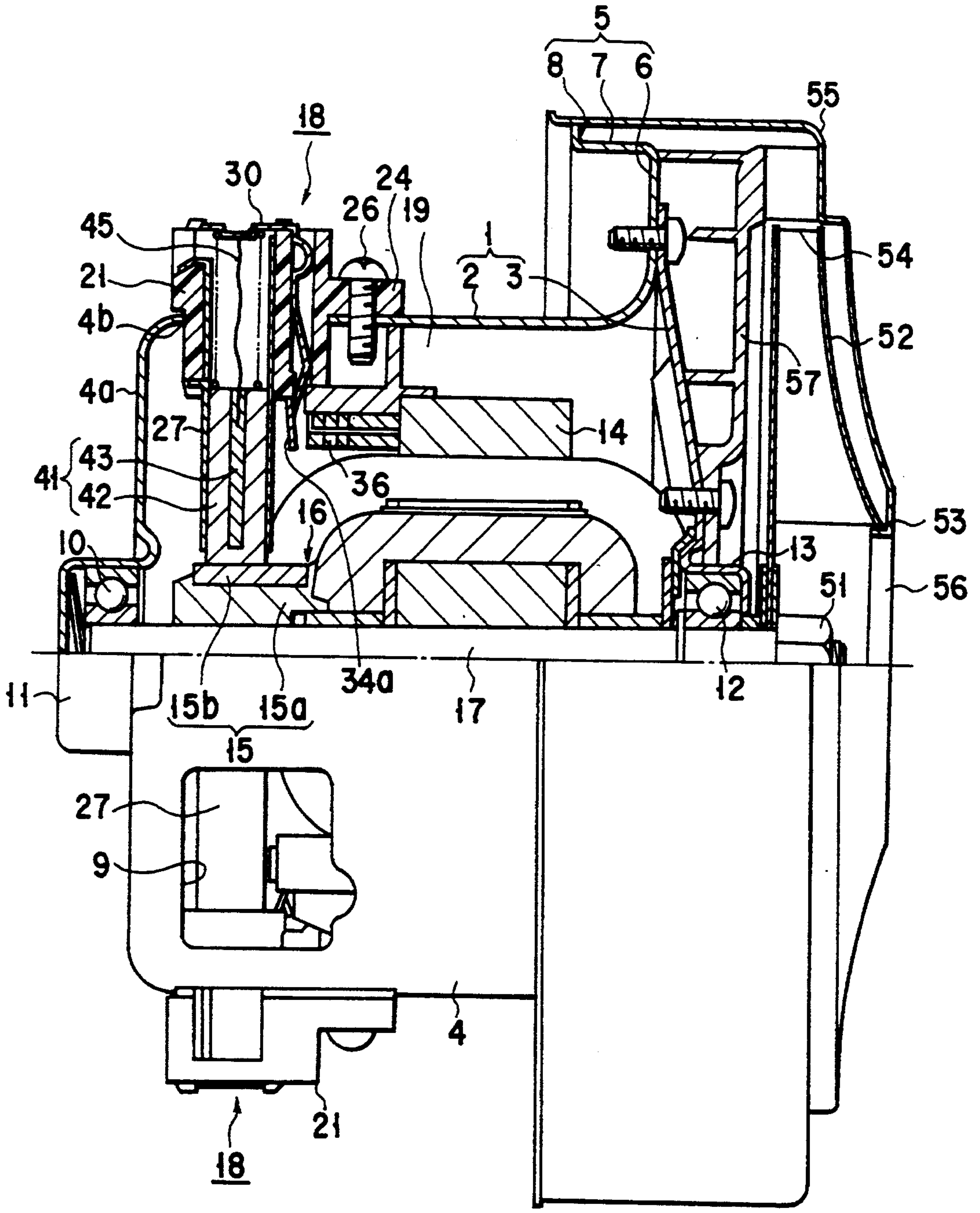
FIG. 3 is a half cutaway side view showing an air flower in which the commutator motor including the brush device of FIG. 1 is installed.

In FIG. 3, reference numeral 1 denotes a metal motor case constituted by a case main body 2 and a case end plate 3.

The case main body 2 has a cylindrical portion 4 with a bottom 4*a*. A mounting portion 5 is integrally formed on the peripheral edge of an opening of, the case main body 2, located opposite to the bottom 4*a*. The mounting portion 5 is constituted by an annular flat portion 6, a cylindrical portion 7, and a protruding edge 8. The annular flat portion 6 extends outward from the opening of the case main body 2 in the radial direction of the case main body 2. The cylindrical portion 7 is bent from the outer periphery of the annular flat portion 6 toward the bottom 4*a* to extend in parallel with the outer surface of the case main body 2. The protruding edge 8 is bent at right angles from the distal end of the cylindrical portion 7 to extend outward in the radial direction. Cooling openings 9 are formed in the outer surface of the cylindrical portion 4 at a position near the bottom 4*a*. In addition, cooling openings (not shown) are formed in the bottom 4*a*. A bearing mounting portion 11 containing a bearing 10 is formed in the center of the bottom 4*a*.

The case end plate 3 covers the opening of the case main body 2. A bearing mounting portion 13 containing a bearing 12 is formed in the center of the case end plate 3. A peripheral edge portion of the case end plate 3 is screwed to the annular flat portion 6 of the mounting portion 5 of the case main body 2.

A stator 14 and a rotor 16 which has a commutator 15 arranged inside the stator 14 are housed in the inner space of the case main body 2. The outer shape of the stator core of the stator 14 is almost rectangular when viewed from the axial direction. The stator core is fixed to the case main body 2 with the four chamfered corner portions of the stator core being in tight contact with the inner surface of the cylindrical portion 4. With this fixing, gaps between the inner surface of the cylindrical portion 4 and the four sides of the outer surface of the stator core serve as air paths 19. A rotor shaft 17 of the rotor 16 is rotatably supported by the bearings 10 and 12 axially at both ends of the case main body 2, and protrudes outward from the bearing 12 and the bearing mounting portion 13.

The commutator 15 is fixed on the rotor shaft 17 at a portion near the bearing 10 in the inner space of the case main body 2. The commutator 15 includes a boss portion 15*a* made of a synthetic resin and designed to be rotated together with the rotor shaft 17, and a plurality of commutator segments 15*b* arranged around the outer periphery of the boss portion 15*a* to be separated from each other in the circumferential direction. The commutator segments 15*b* are electrically insulated from each other. The ends of a plurality of rotor windings are respectively connected to the commutator segments 15*b*.

A pair of positive and negative brush devices 18 are attached to the cylindrical portion 4 of the case main body 2 to pinch the commutator 15. These brush devices 18 will be described below in detail with reference to FIGS. 1 and 2.

A brush holder 21 of each brush device 18 is formed by an electric insulating material such as a synthetic resin. A through hole 23 having an almost rectangular cross-section is formed in a main body portion 22 of the brush holder 21, and the brush holder 21 has an almost rectangular parallelepiped shape. A support piece 24 to be layed on the outer surface of the case main body 2 is formed on the outer peripheral surface of the main body portion 22. As shown in FIG. 3, the support piece 24 of the brush holder 21 is fixed to the outer peripheral surface of the cylindrical portion 4 by screws 26 while the main body portion 22 is inserted into a fitting opening 4*b* opened in the outer peripheral surface of the cylindrical portion 4 of the case main body 2.

A metal brush guide 27 is fitted in the through hole 23 of the brush holder 21. The brush guide 27 protrudes from the main body portion 22 toward the commutator 15. A stopper piece 28 hung on an edge of the through hole 23 located apart from the commutator 15 is formed on the proximal end portion of the guide 27. In addition, an erected piece 25 hung on the commutator-side end surface of the main portion 22 is formed on the base of the protruding portion of the brush guide 27. The erected piece 25 cooperates with the stopper piece 28 to clamp the main body portion 22 and to fix the brush guide 27 to the brush holder 21.

A terminal mounting hole 29 is further formed in the main body portion 22 of the brush holder 21. The mounting hole 29 extends almost in parallel with the through hole 23, and a terminal metal member 30 for electric current supply is mounted in the mounting hole 29.

The terminal metal member 30 is formed of a sheet metal and includes a cap piece 31 covering the opening of the through hole 23 which is located apart from the commutator 15, and a stopper piece 32 integrally formed with the cap piece 31 and inserted in the terminal mounting hole 29. The stopper piece 32 includes a semicircular protruding portion 33 and an elastic bent portion 34 continuous with the protruding portion 33 and bent in the form of a low large triangle. The vertexes of the protruding portion 33 and the bent portion 34 are urged against the inner peripheral surface of the terminal mounting hole 29.

A distal end portion 34*a* of the bent portion 34 protrudes outward from the terminal mounting hole 29. A lock piece 35 engaged on the commutator-side end surface of the main body portion 22 is formed in the distal end portion 34*a* by cutting. The lock piece 35 cooperates with the cap piece 31 to clamp the main body portion 22, so that the removal of the terminal metal member 30 from the terminal mounting hole 29 is prevented. As shown in FIG. 3, the distal end portion 34*a* is inserted in a connection terminal (not shown) of a terminal block 36 attached on the stator core of the stator 14, and is connected to a stator winding through the connection terminal.

A rod-like brush 41 having an almost rectangular cross-section is housed in the inner space of the brush guide 27 to be movable along the axial direction. At least a portion (having an effective length A) of the brush 41 which comes into contact with the commutator 15 and is worn is constituted by a brush main portion 42 and a good conductive portion 43 mounted in the brush main portion 42. The good conductive portion 43 extends almost in parallel with the main current direction in the brush 41. The brush main portion 42 is formed by mixing a conductive material having carbon as a main component with a synthetic resin binding material, pressing the mixture to make a predetermined shape, and sintering the pressed mixture.

The good conductive portion 43 is composed of a material, e.g., copper powder, having an electric resistivity lower than that of the conductive material of the brush main portion 42. The good conductive portion 43 is embedded in a hole 44 extending along the axial direction in the center of the brush main portion 42, and is in tight contact with the brush main portion 42. The copper powder constituting the good conductive portion 43 is stamped to be hardened after it is filled into the hole 44. The diameter or the vertical and horizontal sizes of the cross-section of the good conductive portion 43 perpendicular to the main current direction is set to be smaller than both the vertical and horizontal sizes of the cross-section of the brush main portion 42 perpendicular to the main current direction. A commutator-side end surface 43a of the good conductive portion 43 is covered by a distal end portion 42*a* of the brush main portion 42 in the initial stage of use of the brush 41.

One end portion of a pigtail 45 a proximal end of which is spot-welded to the cap piece 31 of the terminal metal member 30 is connected to the brush 41. In this embodiment, the pigtail 45 is composed of three bundled conductive lines twisted with each other, and each of the bundled lines is composed by bundling twenty-seven slender copper (of lower resistivity) lines each having the diameter of 0.08 mm. More specifically, one end portion of the pigtail 45 is inserted in an opening end of the hole 44 of the brush main portion 42 and is fixed therein by the copper powder packed in the hole 44 to form the good conductive portion 43. Note that in order to reliably fix one end portion of the pigtail 45, a part of the powder lŏcated at the opening end portion of the hole 44 is hardened by a liquid adhesive agent. Therefore, the effective length A of the brush 41 corresponds to the portion between the end surface of the above described one end portion of the pigtail 45 and the commutator-side end surface of the brush main portion 42.

The connection of the above described one end portion of the pigtail 45 is performed in the following manner. At first, the copper powder is filled up in the hole 44 and is stamped to be hardened until the hardened copped powder has a length corresponding to the effective length A. Next, one end portion of the pigtail 45 is inserted into the opening end portion of the hole 44, and the copper powder is further filled up in the opening end portion of the hole 44 and is stamped to be hardened. Finally, a liquid adhesive agent is sunk in the opening of the hole 44.

A compression coil spring 46 is interposed between the proximal end surface of the motor brush 41 and the cap piece 31 covering the opening of the through hole 23 of the main body portion 22. The compression coil spring 46 always urges the brush 41 toward the commutator 15. The commutator-side end portion of the brush 41 protrudes from the brush guide 27 by the urging force of the compression coil spring 46 and is pressed on the outer peripheral surface of the commutator 15, as shown in FIG. 3.

A commutator motor used in the air blower of the vacuum cleaner is constituted by the above-described components, i.e., the motor case 1, the bearings 10 and 12, the stator 14, the rotor 16, and the brush devices 18.

As shown in FIG. 3, a centrifugal fan 52 is attached on a protruding end portion of the rotor shaft 17, protruding outward from the end plate 3 of the motor case 1, by a nut 51. The centrifugal fan 52 has an inlet port 53 in its center and an outlet port 54 in its peripheral end. The centrifugal fan 52 is covered by a fan cover 55. The cover 55 is fitted on the mounting portion 5 of the case main body 2, and has an opening 56 adjacent to the inlet port 53 of the centrifugal fan 52. The peripheral edge of the opening 56 enters in the inlet port 53 of the centrifugal fan 52.

With this structure, when the centrifugal fan 52 is rotated, air is taken into the inlet port 53 of the centrifugal fan 52 through the opening 56 of the fan cover 55, and the air is foribly discharged from the outlet 54 of the centrifugal fan 52. A current plate 57 for guiding the air discharged from the centrifugal fan 52 into the motor case 1 is arranged between the centrifugal fan 52 and the mounting portion 5 of the case main body 2. The current plate 57 is screwed on the frame end plate 3. The current plate 57 serves to straighten the air discharged from the outlet port 54 of the centrifugal fan 52 and converts the dynamic pressure of the discharged air into a static pressure in the straightening process. The air straightened by the current plate 57 is blown into the motor case 1 and is discharged to the outside of the motor case 1 from the cooling openings 9 in the proximal end portion of the case main body 2 after passing through the air path 19 formed between the four sides of the outer peripheral surface of the stator 14 and the inner peripheral surface of the case main body 2.

In the air blower having the above-described arrangement, electric current flowing between the commutator segments 15*b* of the commutator 15 and the pigtail 45 of the brush device 18 mainly flows in the good conductive portion 43 of the brush 41 while the air blower is operated. Since the brush 41 is so constructed that the good conductive portion 43 having an electric resistance lower than that of the brush main portion 42 is embedded in the brush main portion 42 almost throughout the total length of the brush main portion 42, the total electric resistance of the brush 41 is lower than that of a conventional brush constituted by only a brush main portion. Especially in this embodiment, since the pigtail 45 is directly connected to the good conductive portion 43, the total electric resistance of the brush 41 is further reduced. Note that the total electric resistance of the brush 41 of the embodiment is about 0.054, which is ½ that of the conventional brush constituted by only the brush main portion. For this reason, the resistance loss of the current in the brush 41 can be reduced as compared with the conventional brush. With this reduction of the resistance loss, the operation efficiency of the commutator motor for the air blower can be increased.

In addition, with the reduction in the total electric resistance of the brush 41, the amount of heat generated by the brush 41 can be reduced. Furthermore, sparks generated between the motor brush 41 and the commutator 15 can be reduced for the following reasons.

Firstly, since the diameter or the vertical and horizontal sizes of the cross-section of the good conductive portion 43 is smaller than both the vertical and horizontal sizes of the cross-section of the brush main portion 42, a great decrease in the commutation resistance can be prevented, unlike the case the entire brush 41 is composed by only an electric conductive material having a low resistance, thus allowing a reduction in a short-circuit current during commutation.

Secondly, since the total electric resistance of the brush 41 is low, as described above, the brush main portion 42 can be composed of a material having a good contact characteristic (a characteristic for keeping contact of the brush 41 with the commutator 15), e.g., a resin binded type conductive material, thus reducing the total elasticity coefficient of the brush 41.

Since the brush 41 generates only a small amount of heat and is heated only slightly by sparks, the temperature of the brush 41 and that of the commutator 15 are suppressed to low degree.

For this reason, heat deteriorations of the brush 41 and that of the commutator 15 are prevented, and their service lives and hence the service life of the commutator motor are prolonged. In addition, an increase in input and a decrease in size of the commutator motor can be realized. Furthermore, since a rise in temperatures of the brush 41 and that of the commutator 15 are suppressed, as described above, the axial length of the brush 41 and that of the commutator 15 along the axial direction of the rotor shaft 17 can be decreased. This allows a decrease in length of the rotor shaft 17, resulting in a reduction in size of the overall air blower in its axial direction.

In the initial stage of use of the brush 41, the distal end portion 42*a* of the brush main portion 42 covers the commutator-side end surface 43*a* of the good conductive portion 43. For this reason, initially, the brush main portion 42 and the good conductive portion 43 having different physical characteristics do not simultaneously come into slidable contact with the commutator 15. Therefore, the initial performance of the brush 43 can be stabilized. In addition, since the brush main portion 42 covering the good conductive portion 41 constitutes the bottom of the hole 44, the work for packing the copper powder into the hole 44 becomes easy.

Furthermore, since the good conductive portion 43 of the brush 41 is arranged in the inner part of the brush main portion 42 and is enclosed therewith, the good conductive portion 43 can be held by the brush main portion 42 with high reliability. This structure reliably prevents the good conductive portion 43 from peeling off from the brush main portion 42 regardless of vibrations and the like acting on the brush 41 upon slidable contact between the commutator 15 and the brush 41.

Moreover, since the good conductive portion 43 is composed of only an electric conductive powder, a powder produced by wearing of the brush 41 does not include any substance which interferes with current flowing between the brush 41 and the commutator segments 5*b*. Note that if the good conductive portion 43 is fixed to the brush main portion 42 with an adhesive agent, the powder produced by wearing of the brush 41 includes an adhesive agent powder, and hence an electric resistance is generated between the brush 41 and the commutator 15.

Second Embodiment

Figure 4:
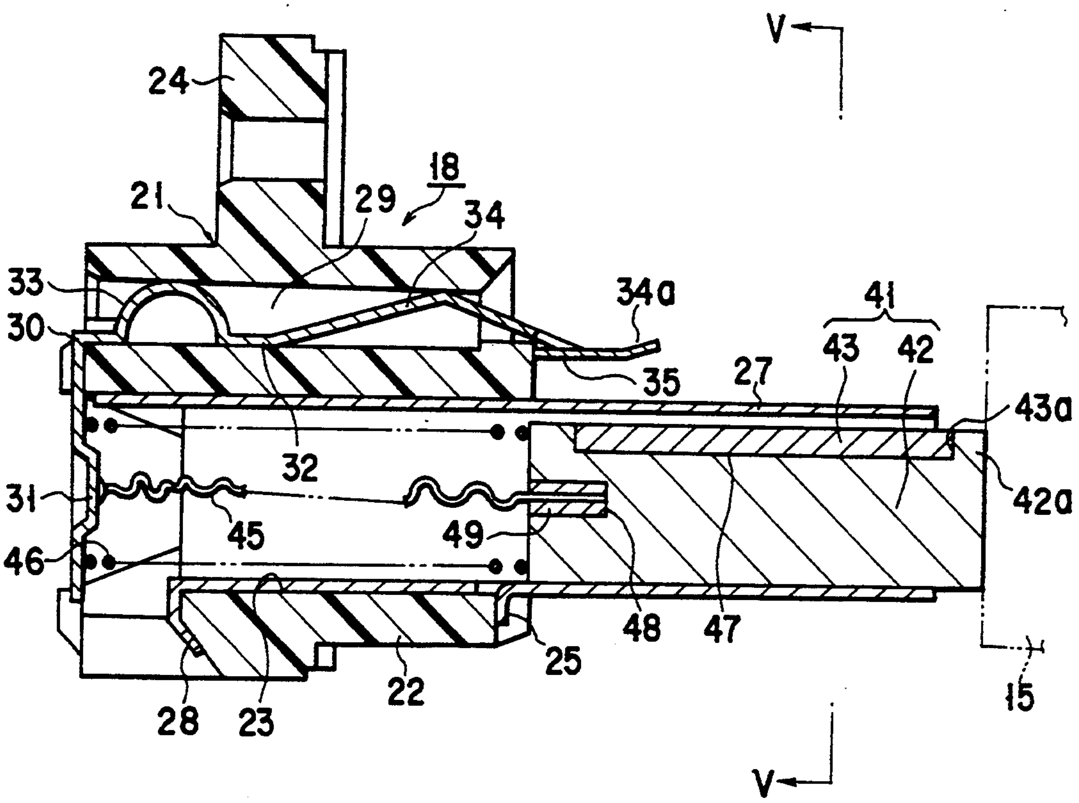
FIG. 4 is a longitudinal sectional view showing a brush device holding a brush according to the second embodiment of the present invention.
Figure 5:
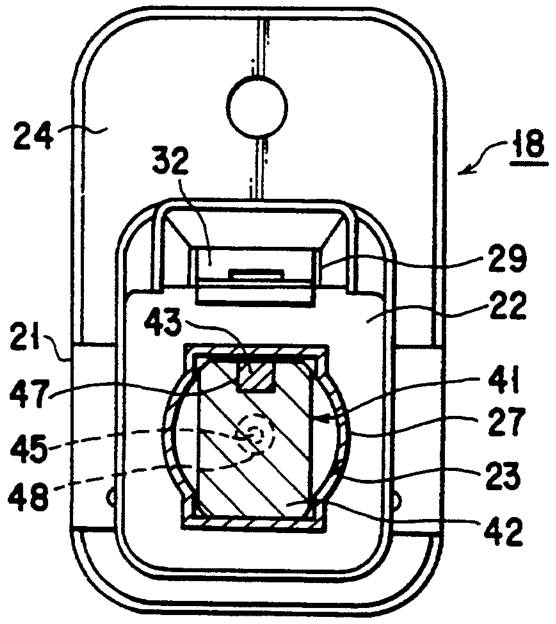
FIG. 5 is a sectional view taken along a line V—V in FIG. 4.

FIGS. 4 and 5 show a brush device holding a brush according to the second embodiment of the present invention.

In this embodiment, a groove 47 open only in the outer peripheral surface of the brush main portion 42 extends in the longitudinal direction of the brush main portion 42 (the main current direction of the brush 41). In addition, a copper powder filled in this groove 47 and hardened includes a good conductive portion 43. Referring to FIG. 4, reference numeral 48 denotes a pigtail mounting hole formed independently of the groove 47 in the proximal end surface of the brush main portion 42. One end portion of the pigtail 45 and an electric conductive powder 49 are mounted and packed in the hole 48 so that the above described one end portion of the pigtail 45 is attached to the brush main portion 42 by the powder 49.

The arrangement of the second embodiment is the same as that of the first embodiment except for the structure described above. Therefore, the same reference numerals in the second embodiment denote the same constructional members as in the first embodiment, and a detailed description thereof will be omitted.

In the second embodiment, the objects of the present invention can be achieved by the same function as that of the first embodiment.

Third Embodiment

Figure 6:
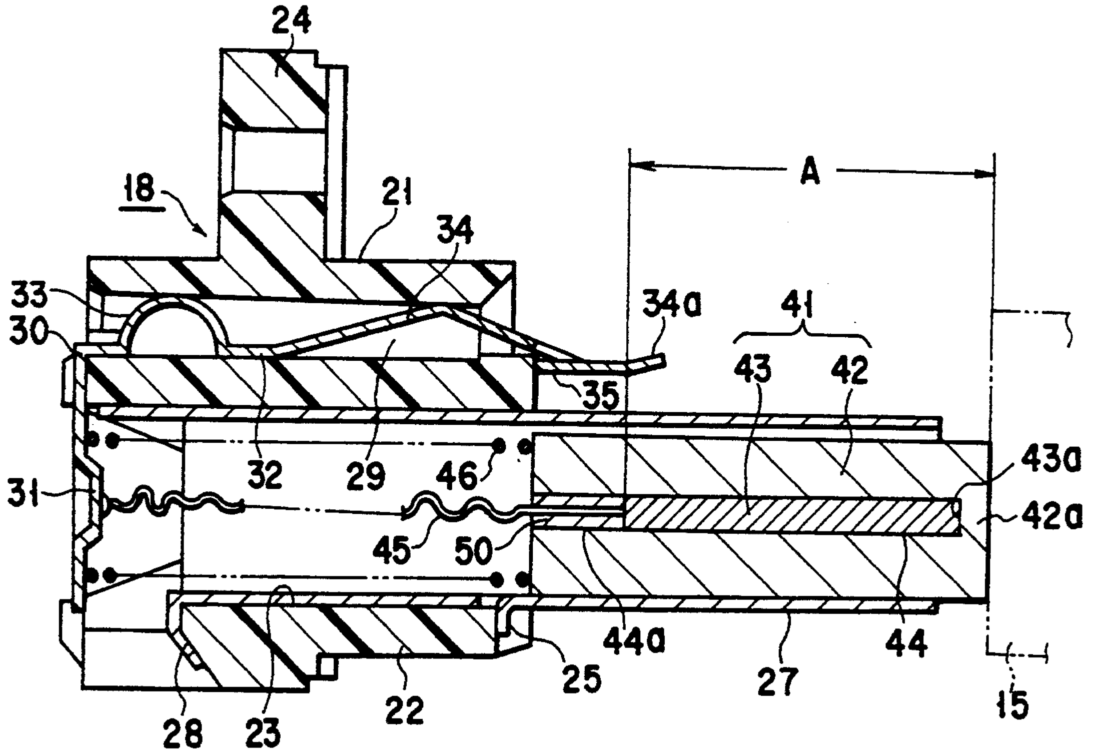
FIG. 6 is a longitudinal sectional view showing a brush device holding a brush according to the third embodiment of the present invention.

FIG. 6 shows a brush device holding a brush according to the third embodiment of present invention. In this embodiment, the good conductive portion 43 embedded in the center hole 44 formed in the brush main portion 42 to extend along the main current direction of the brush 41 is formed by pressing a conductive powder such as a copper powder into a rod in advance. The good conductive portion 43 has a length smaller than the total length of the hole 44 and is forcibly inserted into the hole 44. After the good conductive portion 43 is forcibly inserted into the hole 44, one end portion of the pigtail 45 is inserted into an opening end portion 44*a* of the hole 44 and an electric conductive powder 50 such as a copper powder is further packed therein. The conductive powder 50 is stamped to be hardened and is impregnated with an adhesive agent to mechanically and electrically couple the brush 41 and the pigtail 45 to each other.

The arrangement of the third embodiment is the same as that of the first embodiment except for the structure described above. Therefore, the same reference numerals in the third embodiment denote the same constructional members as in the first embodiment, and a detailed description thereof will be omitted. In the third embodiment, the objects of the present invention can be achieved by the same function as that of the first embodiment.

Note that in the third embodiment, instead of the hole 44, a groove may be formed in the outer peripheral surface of the brush main portion 42 to extend along the main current direction of the main brush 41, and the good conductive portion 43, which has been solidified in the form of a rod at a high density, can be forcibly inserted in the groove.

In the third embodiment, since the conductive powder serving as the good conductive portion 43 is formed into a rod in advance, the work for filling up the conductive powder into the hole 44 in the brush main portion 42 and stamping it to harden it can be omitted. It is easy to insert the good conductive portion 43, solidified beforehand in the form of a rod, into the hole 44 of the brush main portion 42, so that the manufacture of the brush 41 is facilitated.

In addition, since the good conductive portion 43, solidified beforehand in the form of a rod at a high density, has a high strength, the good conductive portion 43 hardly collapses in the hole 44 regardless of variations acting on the entire brush 41 while the brush 41 is used. Therefore, this structure prevents the conductive powder constituting the good conductive portion 43 from escaping from the hole 44 to the outside thereof through the gaps between a plurality of commutator segments of the commutator 15 while the brush 41 is used after wearing of the brush 41 reaches at the commutator-side end surface 43*a* of the good conductive portion 43.

Fourth Embodiment

Figure 7:
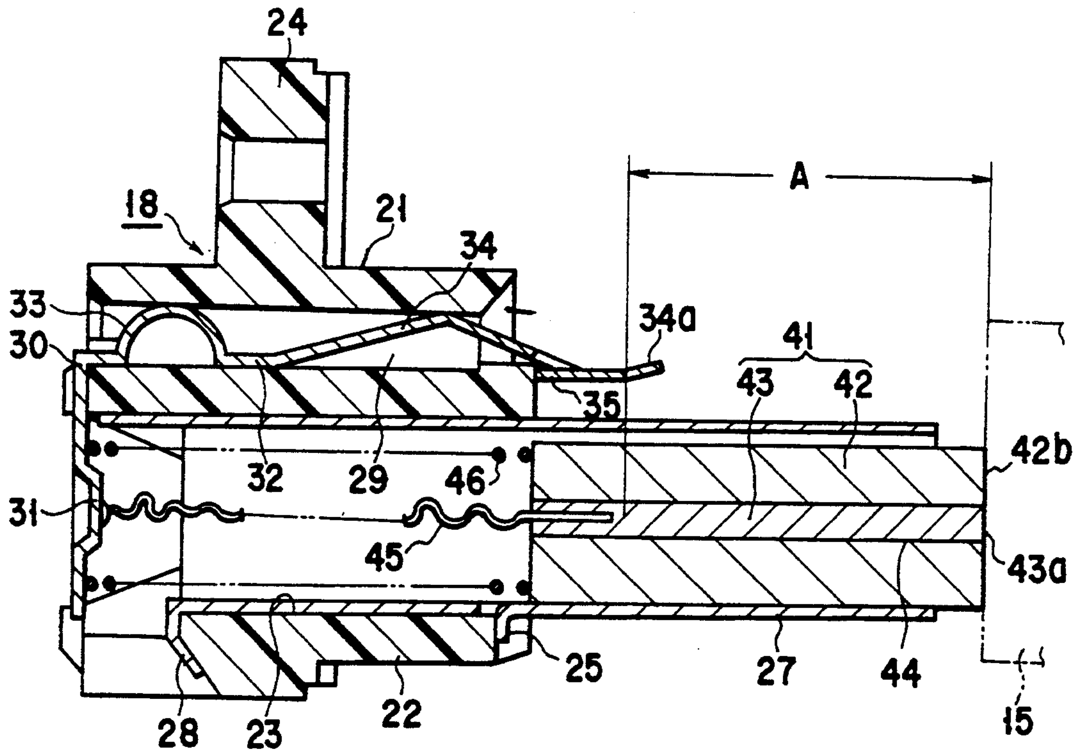
FIG. 7 is a longitudinal sectional view showing a brush device holding a motor brush according to the fourth embodiment of the present invention.

FIG. 7 shows a brush device holding a brush according to the fourth embodiment of the present invention.

In this embodiment, the through hole 44 is formed in the center of the brush main portion 42 to extend along the main current direction throughout the total longitudinal length of the brush main portion 42. The good conductive portion 43 made of a copper powder is embedded in the hole 44. With this structure, the commutator-side end surface 43*a* of the good conductive portion 43 is exposed in a commutator-side end surface 42*b* of the brush main portion 42 to be located on the same level before the start of use of the brush 41. In this case, starting at the same level includes manufacturing torelance. That is, slight projections and recesses of the commutator-side end surface 43*a* of the good conductive portion 43 with respect to the end surface 42*b* of the brush main portion 42 are included in the same level.

The arrangement of the fourth embodiment is the same as that of the first embodiment except for the above-described structure. Therefore, the same reference numerals in the fourth embodiment denote the same parts as in the first embodiment, and a detailed description thereof will be omitted. In the fourth embodiment, the objects of the present invention can be achieved by the same function as that of the first embodiment.

In addition, according to the fourth embodiment, since the commutator-side end surface 43*a* of the good conductive portion 43 comes into contact with a commutator 15 from the start of use of the brush 41, electric current directly flows between the good conductive portion 43 and the commutator 15.

This structure, therefore, can prevent a part of the commutator-side end portion of the brush main portion 42, located outside of the commutator-side end surface of the good conductive portion 43 and covering the commutator-side end surface, from being heated to an abnormally high temperature by high-density current concentrating on the part of the commutator-side end portion of the good conductive portion 43, thus preventing a decrease in a flexural strength of the commutator-side end portion. This can reliably eliminate the possibility of damaging the commutator-side end portion of the brush 41.

In the case that the commutator-side end surface 43*a* of the good conductive portion 43 is covered by the brush main portion 42 in the initial stage of use of the brush 41, high-density current mainly guided by the good conductive portion 43 may concentrate on the part of the commutator-side end portion of the brush main portion 42, which is adjacent to the commutator-side end surface 43*a* of the good conductive portion 43, so that there is a possibility that the part is abnormally heated to 200° C. or more.

Figure 8:
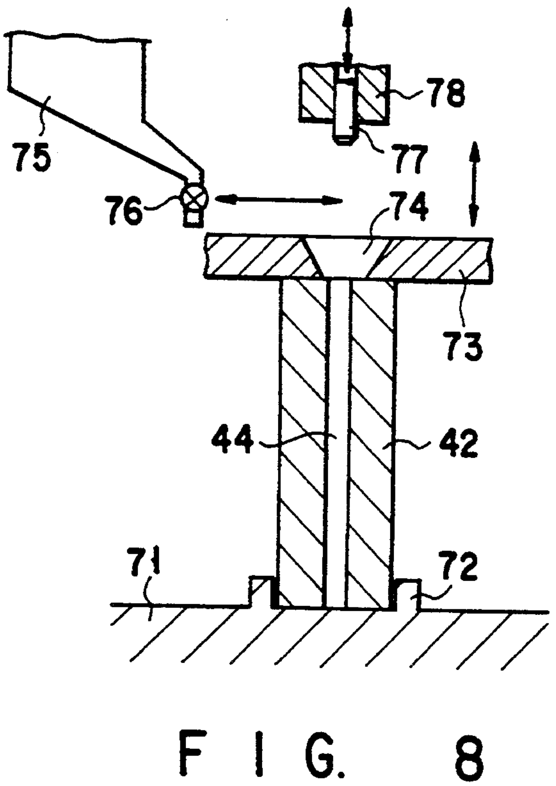
FIG. 8 is a longitudinal sectional view schematically showing the structure of a device for packing copper powder in a hole of a brush main portion of the brush according to the fourth embodiment of the present invention.

FIG. 8 shows a device for embodying the good conductive portion 43 in the through hole 44 of the brush main portion 42 in the manufacturing process for the brush 41 of the fourth embodiment. Referring to FIG. 8, reference numeral 71 denotes a jig having a rectangular, annular fitting protruding portion 72 in which the outer peripheral surface of one end portion of the brush main portion 42 is fitted to position the brush main portion 42, and 73 denotes a press plate arranged above the jig 71 to be freely movable along the vertical direction. When the press plate 73 is moved downward, it is brought into contact with the upper end surface of the brush main portion 42 on the jig 71 so as to press the brush main portion 42 against the jig 71, thus holding the brush main portion 42. The press plate 73 has a taper hole 74 gradually tapering downward. When the press plate 73 presses the brush main portion 42, the taper hole 74 communicates with the hole 44 in the brush main portion 42. Reference numeral 75 denotes a hopper for feeding an electric conductive powder, e.g., a copper powder, as a material for the good conductive portion 43 into the hole 44 in the brush main portion 42. The hopper 75 is freely movable in the horizontal direction and normally stays the position shown in FIG. 8 where it does not interfere with the vertical movement of the press plate 73. An electromagnetic switching valve 76 is arranged at the outlet of the hopper 75. Reference numeral 77 denotes a push rod to be inserted in or removed the hole 44 in the brush main portion 42. The push rod 77 is to be movable vertically by a stationary guide 78 arranged above the press plate 73 at a predetermined position with respect to the jig 71.

In the copper powder embodying device having such an arrangement, one end portion of the brush main portion 42 having the hole 44 formed therein is firstly fitted in the fitting protruding portion 72 on the upper surface of the jig 71. The press plate 73 is then lowered to be brought into contact with the upper surface of the brush main portion 42. As a result, the lower end of the hole 44 in the brush main portion 42 is covered by the upper surface of the jig 71 and the upper end of the hole 44 communicates with the taper hole 74 of the press plate 73. Thereafter, the hopper 75 is horizontally moved to a position where its outlet opposes the taper hole 74, and the switching valve 76 is opened until a proper amount of copper powder in the hopper 75 is fed into the hole 44 in the brush main portion 42. Subsequently, the hopper 75 is moved back to the initial position, and the push rod 77 is moved downward to stamp and harden the powder in the hole 44. By repeating such a series of actions, the powder is packed in the hole 44 by an amount corresponding to the effective length A. The pigtail 45 is connected to the brush main portion 42 after this process.

In the fourth embodiment, instead of the hole 44, a groove may be formed in the outer peripheral surface of the brush main portion 42 to extend along the main current direction throughout the total length of the brush main portion 42, and a conductive powder can be packed in the groove to constitute the good conductive portion 43. In addition, the good conductive portion 43 embodied in the groove, may be solidified beforehand in the form of a rod at a high density, and then the solidified rod-shoped good conductive portion 43 is forcibly inserted in the groove.

The present invention is not limited to the above-described embodiments. For example, a material for the good conductive portion 43 is not limited to a copper powder, but a carbon powder, having an electric resistance lower than that of the carbon constituting the brush main portion 42 because of the difference between contents, densities, and manufacturing methods may be used. Alternatively, a noble metal powder such as a silver or gold powder may be used. In addition, the good conductive portion 43 may be constituted by a metal rod superior to carbon in the electric conductivity. In each embodiment described above, the pigtail 45 is connected to the brush 41. However, an electric conductive leaf spring may be used in place of the pigtail. In this case, since the conductive leaf spring can urge the brush 41 against the commutator 15, the compression coil spring 46 is omitted. Furthermore, according to the present invention, the brush may be composed of two or more types of materials having different electric resistivities, and a good conductive portion of the brush which has the lowest resistivity to reduce the total electric resistance of the brush may have any cross-sectional shape, e.g., a circle, a rectangle, or a triangle. In addition, according to the present invention, a plurality of good conductive portions may be arranged with respect to the brush main portion, and at least one of the good conductive portions can be bonded to the brush main portion with an adhesive agent. Moreover, according to the present invention, a good conductive portion may be formed in a spiral shape extending along the main current direction in the brush main portion or on the outer peripheral surface of the brush main portion.

Fifth Embodiment

Figure 9:
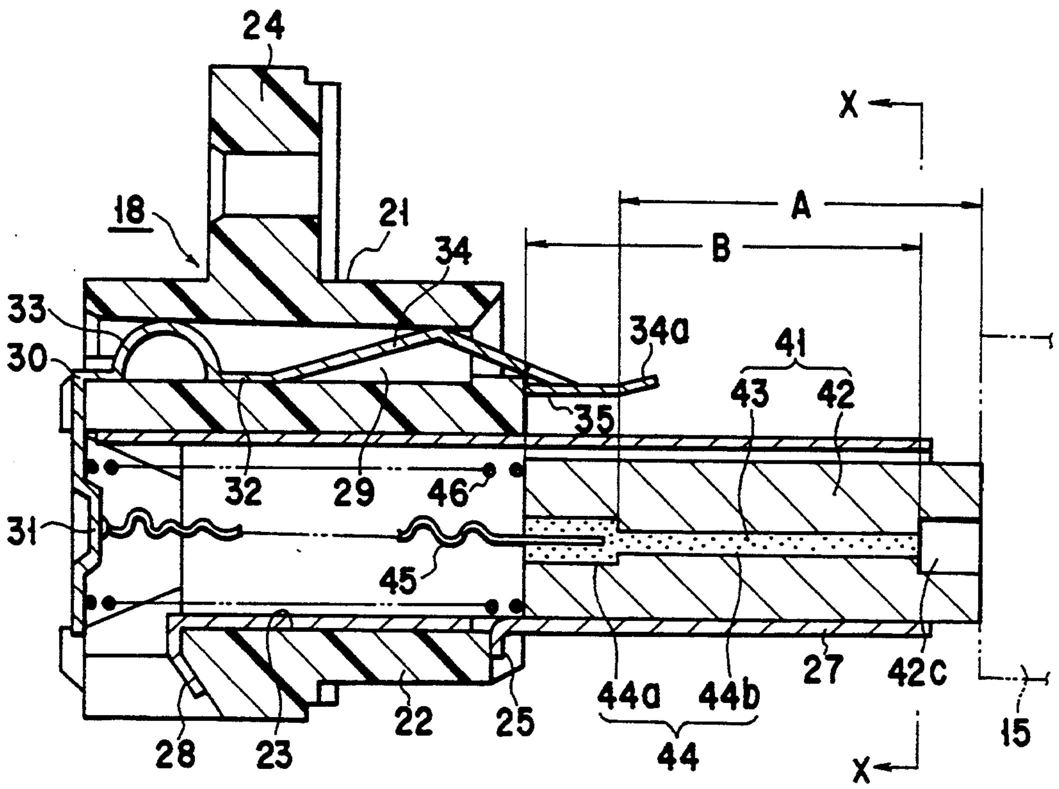
FIG. 9 is a longitudinal sectional view showing a brush device holding a brush according to the fifth embodiment of the present invention.
Figure 10:
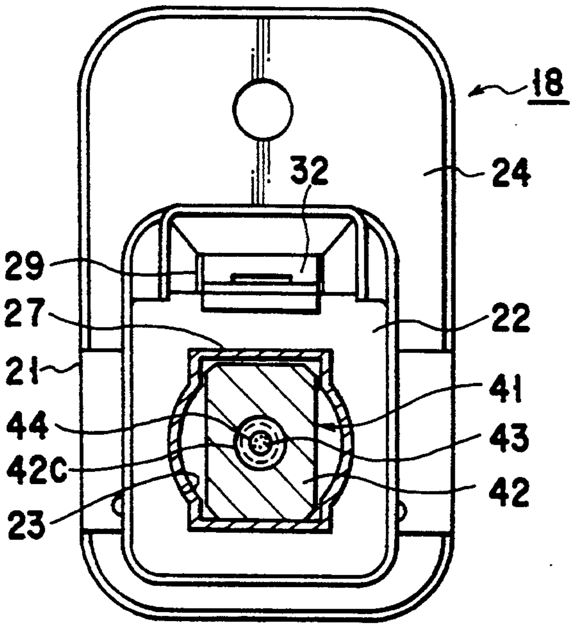
FIG. 10 is a sectional view taken along a line X—X in FIG. 9.

A brush device holding a brush according to the fifth embodiment of the present invention will be described below with reference to FIGS. 9 and 10.

In this embodiment, the hole 44 formed in the center of the brush main portion 42 of the brush 41 is constituted by an embedding portion 44*a* located in the proximal end portion of the brush main portion 42 to be open in the proximal end surface of the brush main portion 42, and a hole main portion 44*b* concentrically extending from the embedding portion 44*a* to the commutator-side end portion of the brush main portion 42. Both the embedding portion 44*a* and the hole main portion 44*b* have circular cross-sections. The cross-sectional area of the hole main portion 44*b* is smaller than that of the embedding portion 44*a*. Therefore, the hole 44 is a stepped hole.

In addition, an air gap 42*c* as a resistance means is formed in the commutator-side end portion of the brush main portion 42 to be continuous with the commutator-side end of the hole main portion 44*b* in the initial stage of use of the brush 41. The gap 42*c* opens in the commutator-side end surface of the brush main portion 42 and has a depth larger than its diameter. The air gap 42*c* has an electric resistivity higher than that of the material for the brush main portion 42. The cross-sectional area of the air gap 42*c* which is perpendicular to the main current direction is larger than the cross-sectional area of the hole main portion 44*b*, i.e., the good conductive portion 43 embedded therein. The air gap 42*c* covers the entire commutator-side end surface of the good conductive portion 43 in the hole main portion 42*b* when viewed from the commutator-side end surface of the brush main portion 42. For example, a total length B of the hole 44 is 23 mm; the diameter of the hole main portion 44*b* is 1.5 mm; the diameter of the air gap 42*c* is 2 mm; and the depth of the air gap 42*c* is 5 mm.

The good conductive portion 43 is formed by packing a powder material, e.g., a copper powder, having an electric resistivity lower than that of the conductive material for the good conductive portion 43, into the hole 44, and stamping the powder to harden it. In this embodiment, in order to further decrease the electric resistivity of the good conductive portion 43, a copper powder plated with silver is used. Furthermore, in the fifth embodiment, in order to facilitate the work for packing the copper powder serving as the good conductive portion 43 into the hole 44, the air gap 42*c* is formed after the packing work is finished. That is, the packing work is performed through the embedding portion 44*a* while the commutator-side end of the hole main portion 44*b* is closed by the commutator-side end portion of the brush main portion 42.

One end portion of the pigtail 45 is inserted into the embedding portion 44*a* of the hole 44 and is subsequently fixed therein by hardening a copper power, packed in the embedding portion 44*a*, by means of a liquid adhesive agent.

The arrangement of the fifth embodiment is the same as that of the first embodiment except for the structure described above. Therefore, the same reference numerals in the fifth embodiment denote the same structual members as in the first embodiment, and a detailed description thereof will be omitted. In the fifth embodiment, the objects of the present invention can be achieved by the same function as that of the first embodiment.

The effects obtained by the unique structure of the fifth embodiment will be described below. In this embodiment, heat generation of the brush 41 suppressed while the brush 41 is used, and damage of the brush main portion 42 due to the heat is prevented for the following reasons. Therefore, the service life of the commutator motor which is defined by the service life of the brush 41 can be prolonged.

In the initial stage of use of the brush 41 of this embodiment, since the air gap 42*c* as the electric resistance means is formed in the commutator-side end surface of the brush main portion 42, electric current mainly flowing to the commutator 15 through the good conductive portion 43 and flowing from the commutator 15 to the good conductive portion 43 is dispersed and flows in the brush main portion 42 along the inner peripheral surface of the air gap 42*c* so as to bypass the air gap 42*c*.

Especially, in this embodiment, since the diameter of the air gap 42*c* is larger than that of the hole 44 and that of the good conductive portion 43, the current dispersing effect is enhanced.

Since the air gap 42*c* serves to decrease the current density in the commutator-side end portion of the brush main portion 42 in the initial stage of use of the brush 41 in this manner, heat generation at the commutator-side end portion of the brush main portion 42 can be suppressed. This prevents the brush main portion 42 from being heated to an abnormally high temperature and being damaged. In addition, since the resistance means is constituted by the air gap 42*c*, thermal expansion of the commutator-side end portion of the brush main portion 42 can be absorbed by the air gap 42*c*, thus further effectively preventing the brush main portion 42 from being damaged by heat.

As in the fifth embodiment, in the case when the good conductive portion 43 is composed by stamping and hardening the copper powder packed in the hole main portion 44*b*, even if the brush 41 is worn by an amount larger than the depth of the air gap 42*c*, the copper powder constituting the good conductive portion 43 escapes little by little to the outside of the brush main portion from the commutator-side end of the hole main portion 44*b* through the gaps between a plurality of commutator segments 15*a* of the commutator 15 upon vibrations produced in the brush 41 slidably contacting the commutator 15. Therefore, the commutator-side end surface of the good conductive portion 43 is always retracted from the commutator-side end surface of the brush main portion 42. With this structure, even if the brush 41 is kept used after the air gap 42*c* is eliminated, electric current does not concentrate on and flow in a part of the commutator-side end surface of the brush main portion 42, similar to the above-described initial stage of use of the brush 41, thus preventing the brush main portion 42 from being damaged by abnormal heat generation throughout the service life of the brush 41.

The present invention is not limited to the fifth embodiment as described above. For example, in the fifth embodiment, the air gap 42*c* serves as an electric resistance means. If, however, a material having an electric resistivity higher than that of the material for the brush main portion 42 and softer than the commutator segments 15*b* of the commutator 15 is embedded in the air gap 42*c*, this material can be used as a resistance means. In addition, the air gap 42*c* serving as a resistance means or the electric resistive material embedded therein may have the same diameter as that of the hole main portion 44*b* of the hole 44.

Figure 11:
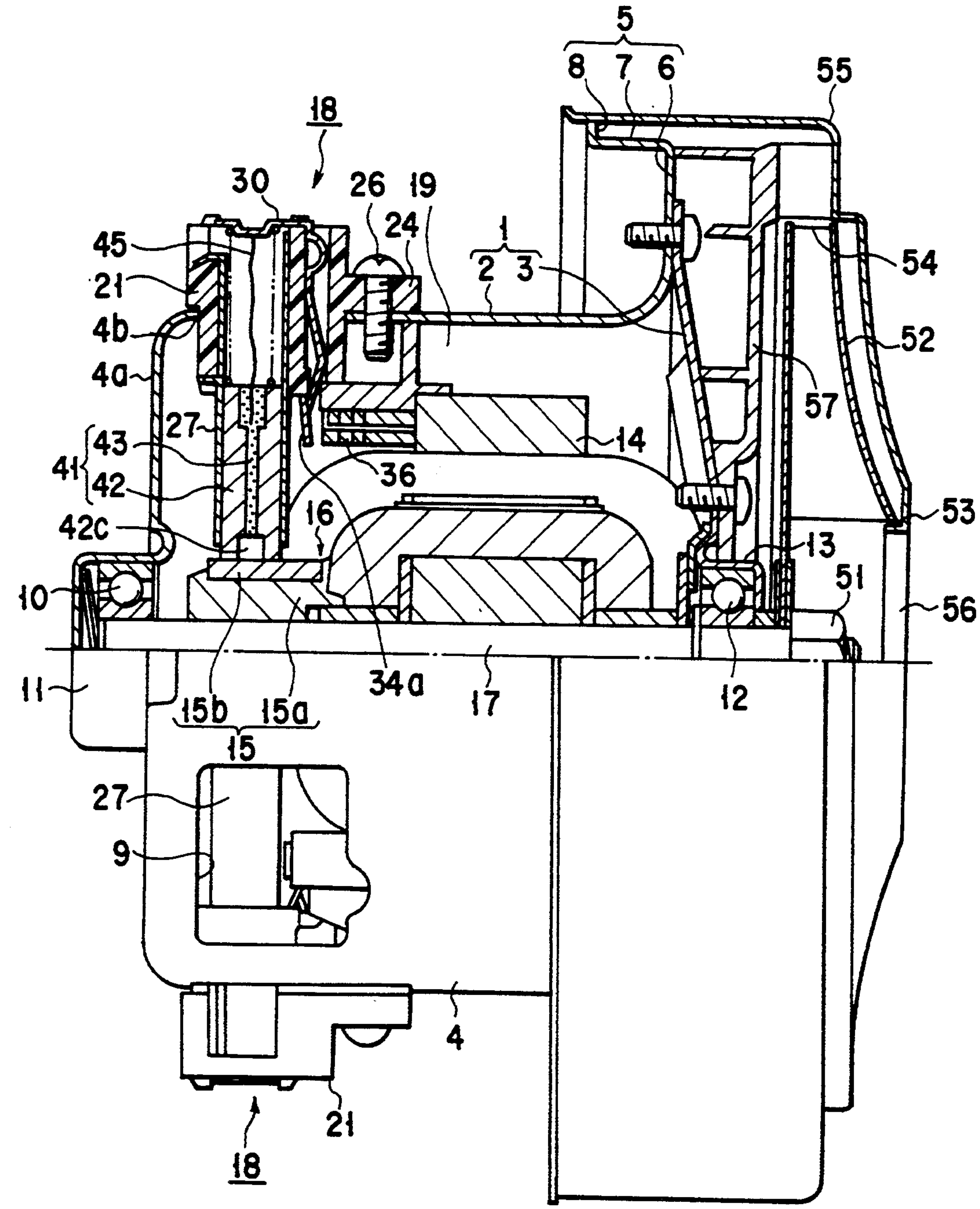
FIG. 11 is a half cutaway side view showing an air flower in which the commutator motor including the brush device of FIG. 9 is installed.

FIG. 11 shows a commutator motor installed in an air blower, and the motor has brush devices 18 holding the brushes 41 of the fifth embodiment as described above. The structures of the commutator motor and the air blower are the same as those using the brushes 41 of the first embodiment. Therefore, the same reference numerals denote the same structural members as in the first embodiment, and a detailed description of arrangements and functions thereof will be omitted.

Sixth Embodiment

Figure 12:
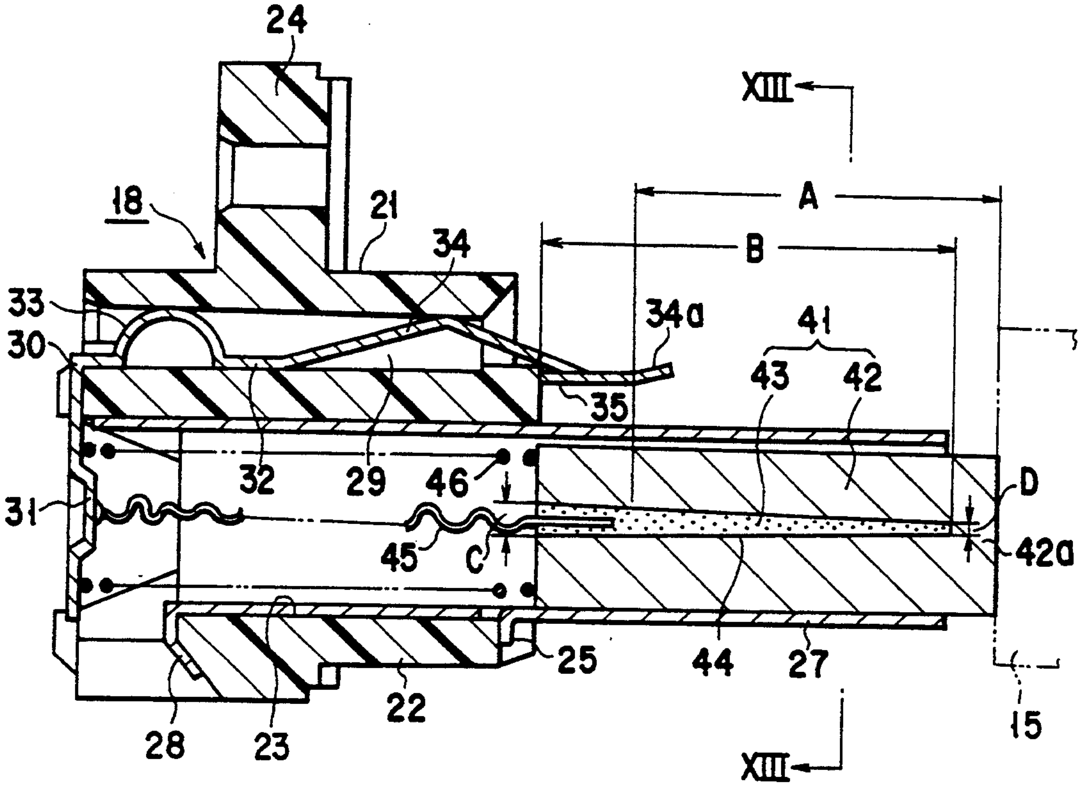
FIG. 12 is a longitudinal sectional view showing a brush device holding a brush according to the sixth embodiment of the present invention.
Figure 13:
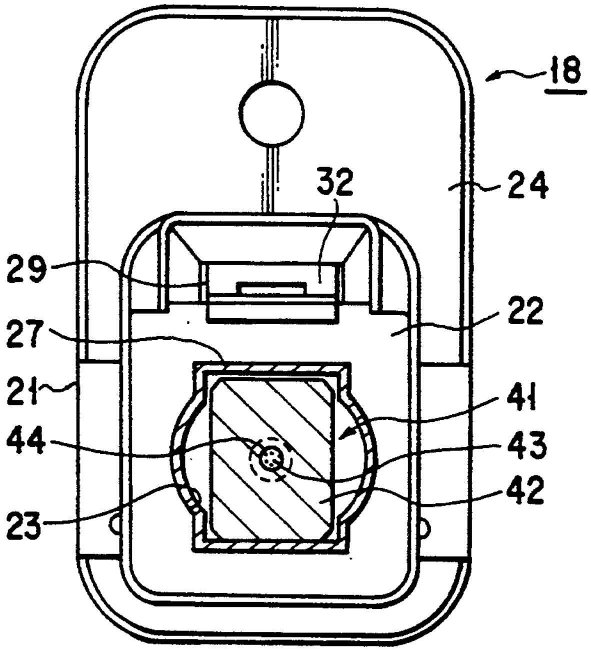
FIG. 13 is a sectional view taken along a line XIII—XIII in FIG. 12.

A brush device holding a brush according to the sixth embodiment of the present invention will be described below with reference to FIGS. 12 and 13.

In this embodiment, the hole 44 formed in the center of the brush main portion 42 of the brush 41 tapers toward the commutator-side end portion of the brush main portion 42. For example, if a total length B of the hole 44 is 23 mm, a diameter C of the proximal end of the hole 44 is set to be about 2.5 mm, and a diameter D of the distal end of the hole 44 is set to be about 1.5 mm. The distal end of the hole 44 is covered by the brush main portion 42 in the initial stage of use of the brush 41.

The good conductive portion 43 is formed by packing a powder material, e.g., a copper powder, having an electric resistivity lower than that of the conductive material for the brush main portion 42, into the hole 44, and stamping and hardening it. In this embodiment, in order to further decrease the electric resistivity of the good conductive portion 43, a copper powder plated with silver is used.

One end portion of the pigtail 45 is connected to the brush 41 in the same manner as described in the first embodiment.

The arrangement of the sixth embodiment is the same as that of the first embodiment except for the structure described above. Therefore, the same reference numerals in the sixth embodiment denote the same structural members as in the first embodiment, and a detailed description thereof will be omitted. In the sixth embodiment, the objects of the present invention can be achieved by the same function as that of the first embodiment.

The effects obtained by the unique structure of the sixth embodiment will be described next. In this embodiment, since the commutator-side end portion 42*a* of the brush main portion 42 covers the commutator-side end of the hole 44, the copper powder serving as the good conductive portion 43 can be easily packed into the hole 44. In addition, since the hole 44 tapers toward its commutator-side end portion, the diameter of the proximal end of the hole 44 is large. This facilitates the work for packing the copper powder serving as the good conductive portion 43 into the hole 44. Furthermore, when the copper powder is stamped in the hole 44 to be hardened, the copper powder is pushed into the pointed commutator-side end portion of the hole 44. Therefore, the copper powder can be firmly hardened at the commutator-side end portion of the hole 44.

After wearing of the commutator-side end surface of the brush main portion 42 reaches at the commutator-side end surface of the hole 44, and the good conductive portion 43 is exposed in the commutator-side end surface of the brush main portion 42, the tapered inner peripheral surface of the hole 44 greatly resists the movement of the good conductive portion 43 toward the distal end (the commutator-side end) of the hole 44. Furthermore, the copper powder constituting the good conductive portion 43, which is sufficiently stamped and hardened up to its commutator-side end portion, hardly collapses from the opening of the hole 44 at the commutator-side end surface of the brush main portion 42.

Therefore, even if, after the commutator-side end portion of the good conductive portion 43 is exposed in the commutator-side end surface of the brush main portion 42 upon wearing of the brush 41, the copper powder constituting the good conductive portion 43 escapes to the outside from the opening of the hole 44 at the commutator-side end through the gaps between a plurality of commutator segments 15*a* of a commutator 15 owing to vibrations produced in the brush 41 slidably contacting the commutator 15, and the escaping amount of the copper powder can be reduced. Consequently, the required function of the good conductive portion 43 can be maintained.

Figure 14:
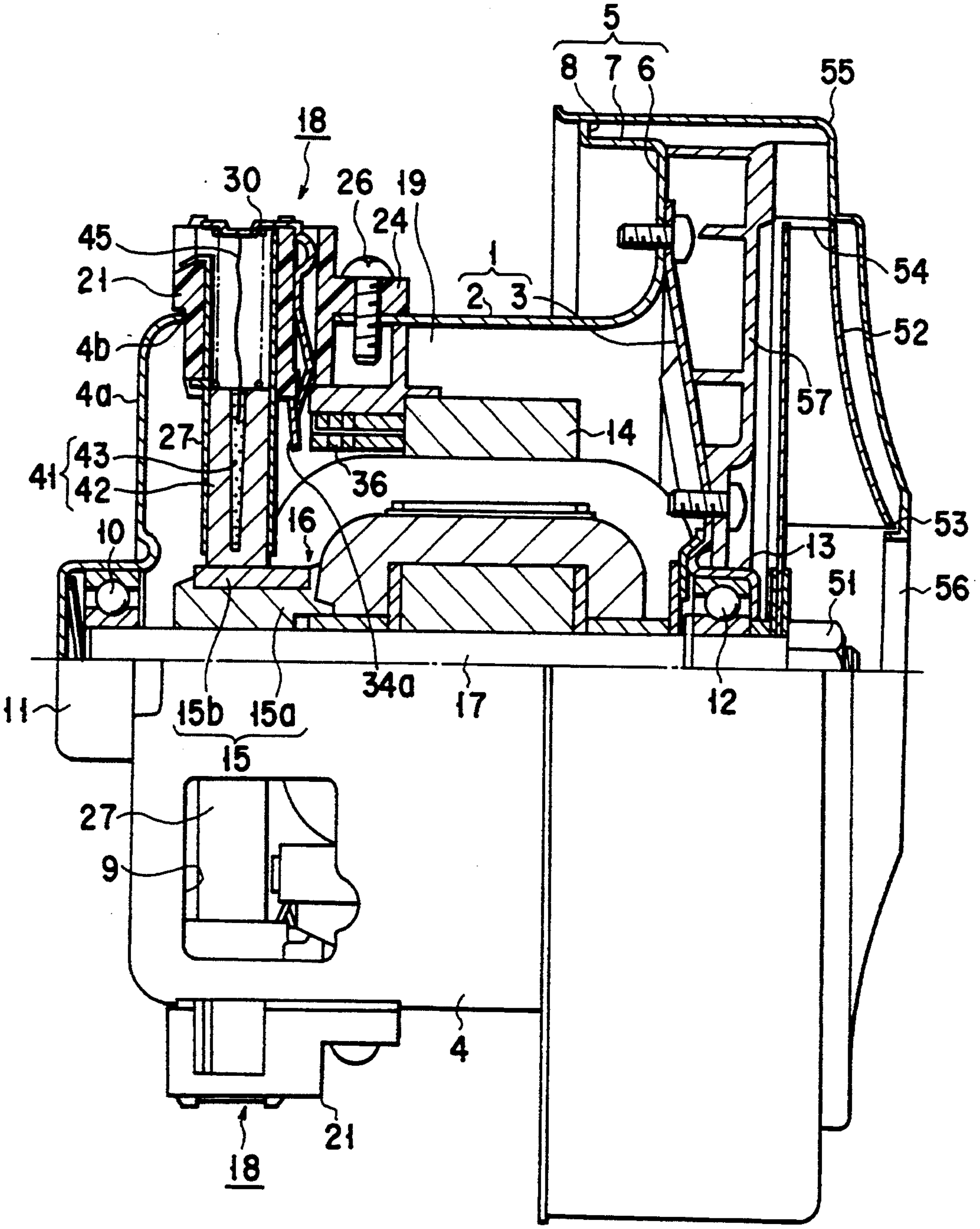
FIG. 14 is a half cutaway side view showing an air flower in which the commutator motor including the brush device of FIG. 12 is installed.

FIG. 14 shows a commutator motor installed in an air blower, and the commutator motor has the brush devices 18 using the motor brushes 41 according to the sixth embodiment of the present invention described above. These commutator motor and air blower have the same structures as those using the brushes 41 of the first embodiment. Therefore, the same reference numerals denote the same structural members as in the first embodiment, and a detailed description thereof will be omitted.

Seventh Embodiment

Figure 15:
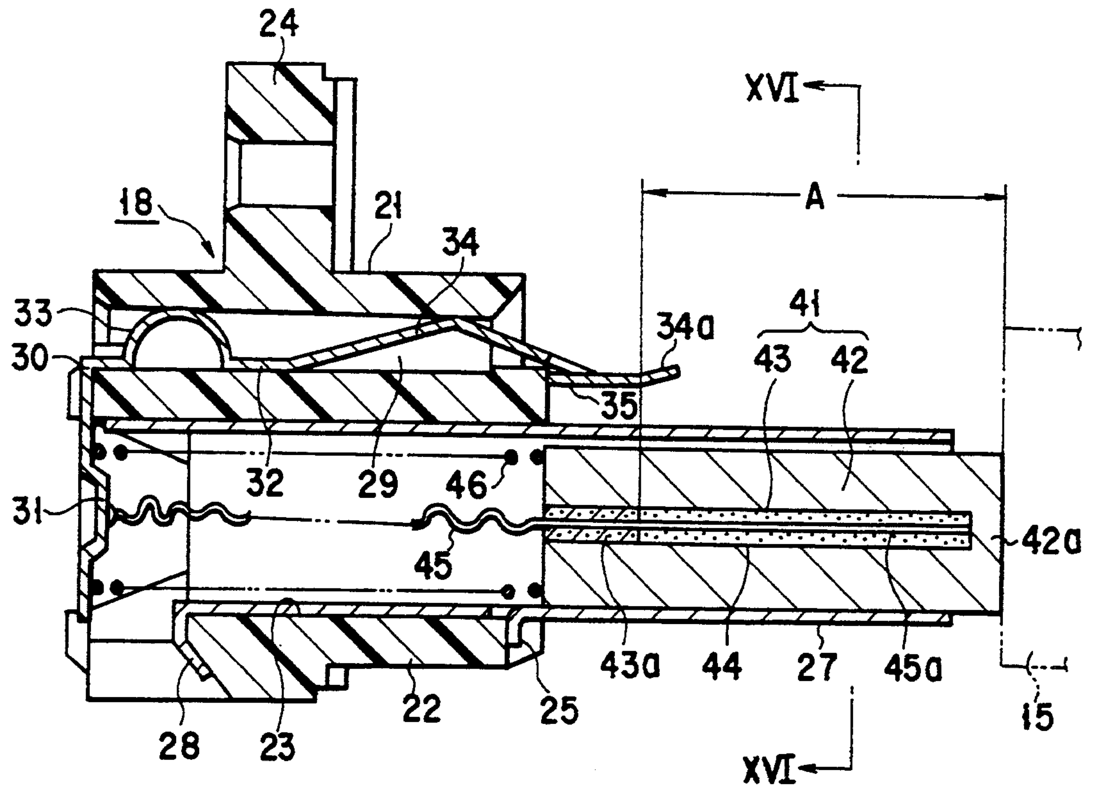
FIG. 15 is a longitudinal sectional view showing a brush device holding a brush according to the seventh embodiment of the present invention.
Figure 16:
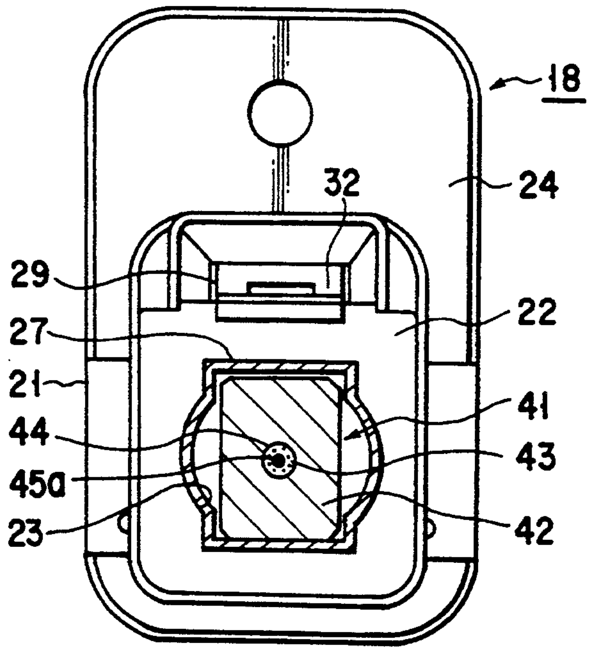
FIG. 16 is a sectional view taken along a line XVI—XVI in FIG. 15.

A brush device using a brush according to the seventh embodiment of the present invention will be described below with reference to FIGS. 15 and 16.

In this embodiment, the commutator-side end portion of the hole 44 formed in the center of the brush main portion 42 is covered by the commutator-side end portion 42*a* of the brush main portion 42.

The copper pigtail 45 is longer than a conventional one by a length corresponding to the effective length A of the brush main portion 42. The pigtail 45 is inserted from the opening of the hole 44 at its proximal end to its the commutator-side covered end. The commutator-side portion 45*a* of the pigtail 45 has an electric resistivity lower than that of the conductive material for the brush main portion 42 and has a diameter much smaller than both the vertical and horizontal sizes of the cross-section of the brush main portion 42.

The commutator-side portion 45*a* of the pigtail 45 is held in the hole 44 by a copper powder as the good conductive portion 43 which is packed in the hole 44 and is stamped and hardened. A proximal end portion 43*a* of the copper powder as the good conductive portion 43 which is located at the opening end portion of the hole 44 is hardened by a liquid adhesive agent to fix the pigtail 45 in the brush main portion 42.

In this embodiment, the commutator-side portion 45*a* of the pigtail 45 provides the same effect as that obtained by the good conductive portion 43. In addition, the total electric resistance of the brush 41 can be reduced as compared with the one including of only the good conductive portion 43. Furthermore, since a great decrease in the commutation resistance can be prevented, unlike the case where the entire brush main portion 42 is composed of a low-resistance conductor, the amount of short-circuit current during commutation can be reduced. The commutator-side portion 45*a* of the pigtail 45 which extends in the good conductive portion 43 throughout its total length improves the structural strength of the good conductive portion 43 in the hole 44.

The arrangement of the seventh embodiment is the same as that of the first embodiment except for the structure described above. Therefore, the same reference numerals in the seventh embodiment denote the same structural members as in the first embodiment, and a detailed description thereof will be omitted. In the seventh embodiment, the objects of the present invention can be achieved by the same function as that of the first embodiment.

Figure 17:
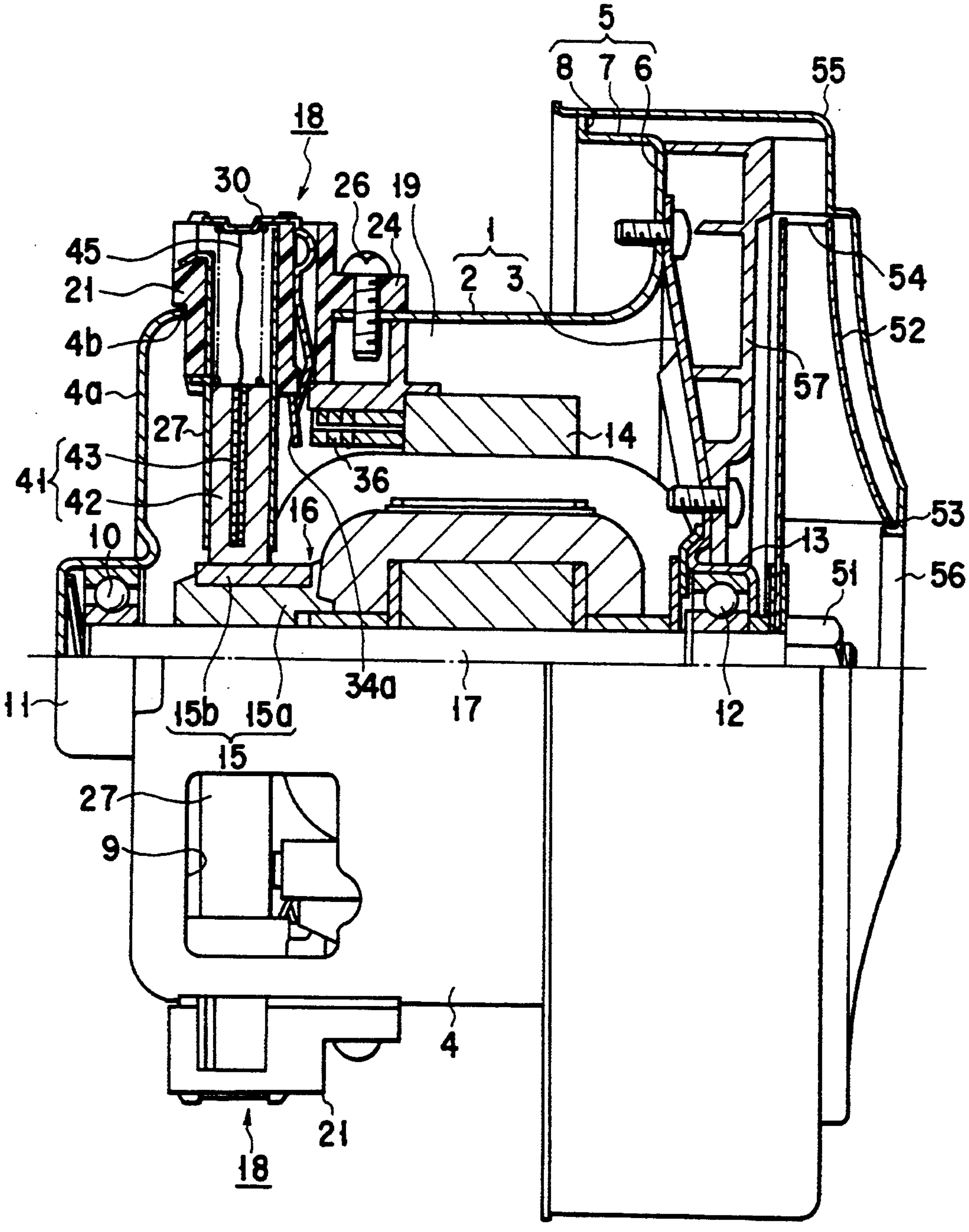
FIG. 17 is a half cutaway side view showing an air flower in which the commutator motor including the brush device of FIG. 15 is installed.

FIG. 17 shows a commutator motor installed in an air blower, and the commutator motor has the brush devices 18 using the brushes 41 according to the seventh embodiment of the present invention described above. These commutator motor and air blower have the same structures as those using the brushes 41 of the first embodiment. Therefore, the same reference numerals denote the same structural members as in the first embodiment, and a detailed description thereof will be omitted.

Eighth Embodiment

Figure 18:
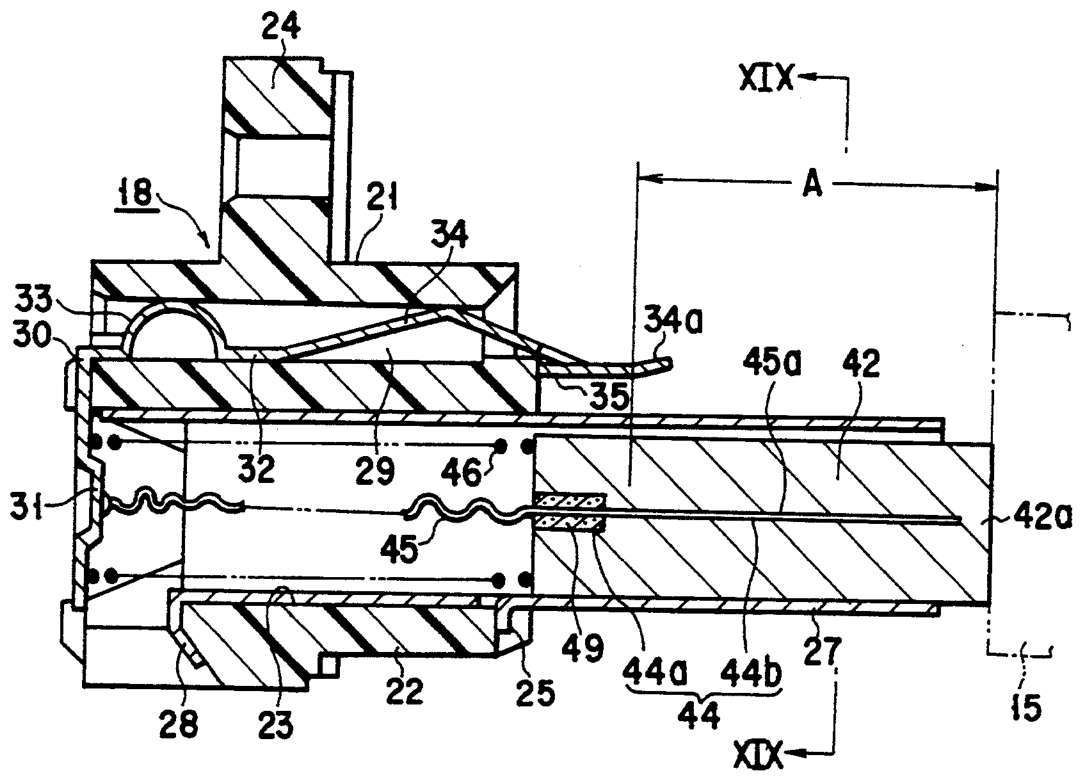
FIG. 18 is a longitudinal sectional view showing a brush device holding a brush according to the eighth embodiment of the present invention.
Figure 19:
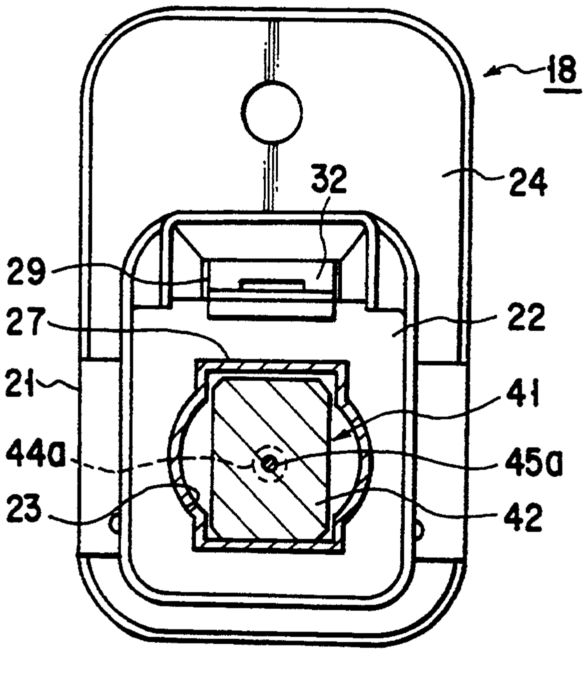
FIG. 19 is a sectional view taken along a line XIX—XIX in FIG. 18.

FIGS. 18 and 19 show a motor brush according to the eighth embodiment of the present invention. In this embodiment, the hole 44 formed in the center of the brush main portion 42 to extend along the main current direction throughout almost the total length of the brush main portion 42 is constituted by a large-diameter portion 44*a* having a diameter larger than that of the pigtail 45, and a small-diameter portion 44*b* having a diameter almost equal to that of the pigtail 45. Similar to the seventh embodiment, the pigtail 45 is longer than a conventional one and has a commutator-side end portion 45*a*. The commutator-side end portion 45*a* of the pigtail 45 is inserted from the large-diameter portion 44*a* of the hole 44, which opens in the proximal end surface of the brush main portion 42, to the small-diameter portion 44*b*, and is in tight contact with the small-diameter portion 44*b*. A copper powder 49 is packed in the large-diameter portion 44*a* and is stamped to be hardened. The pigtail 45 is fixed to the brush main portion 42 by soaking a liquid adhesive agent into the powder 49.

In this embodiment, the commutator-side portion 45*a* of the pigtail 45 has the same function as that of the good conductive portion 43 in each embodiment described above.

The present invention is not limited the seventh and eighth embodiments. For example, a spiral hole or a spiral groove may be formed in or in the outer peripheral surface of the brush main portion 42 to extend along the main current direction, and the commutator-side end portion 45*a* of the pigtail 45 may be embedded therein.

The arrangement of the eighth embodiment is the same as that of the first embodiment except for the structure described above. Therefore, the same reference numerals in the eighth embodiment denote the same structural members as in the first embodiment, and a detailed description thereof will be omitted. In the eighth embodiment, the objects of the present invention can be achieved by the same function as that of the first embodiment.

Ninth Embodiment

Figure 20:
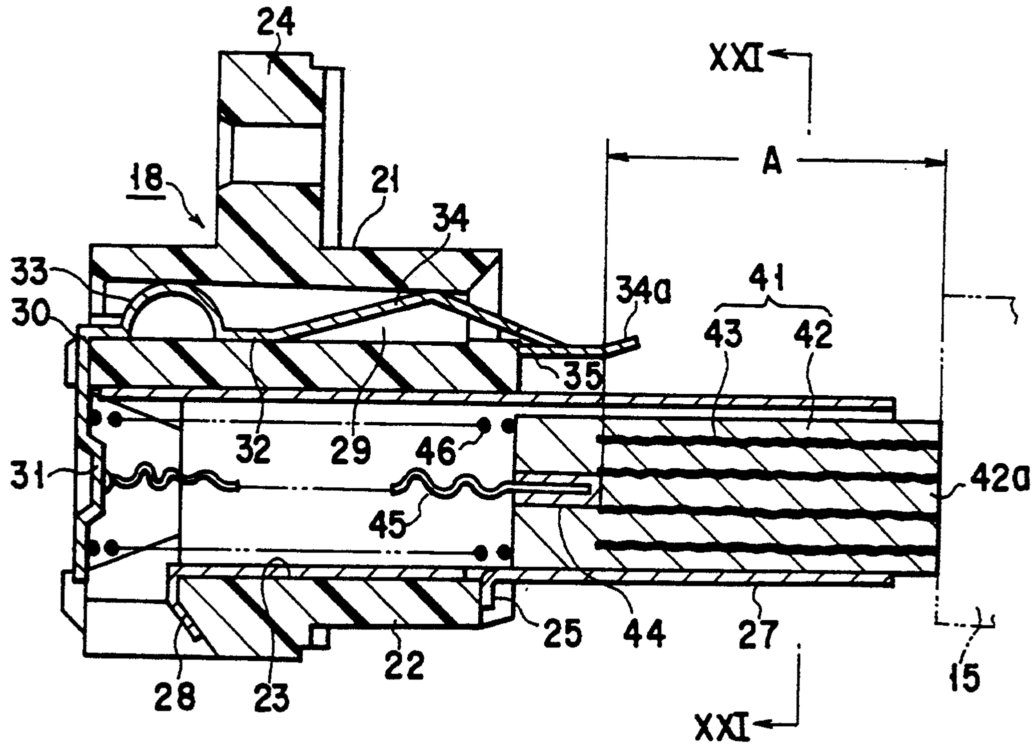
FIG. 20 is a longitudinal sectional view showing a brush device holding a brush according to the ninth embodiment of the present invention.
Figure 21:
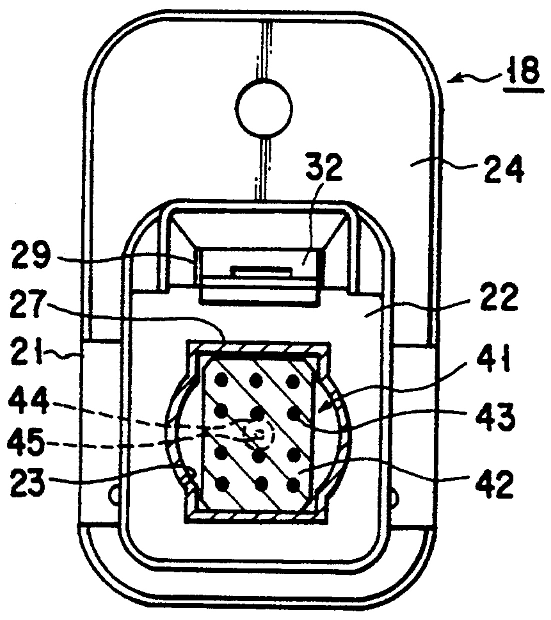
FIG. 21 is a sectional view taken along a line XXI—XXI in FIG. 20.

A brush device holding a brush according to the ninth embodiment of the present invention will be described below with reference to FIGS. 20 and 21.

In this embodiment, the good conductive portion 43 embedded in the brush main portion 42 of the a brush 41 is constituted by a plurality (about 10 to 15) of conductors dispersed in the brush main portion 42. One end portion of the pigtail 45 is inserted into the hole 44 formed in the center of the proximal end surface of the brush main portion 42 and is fixed therein by hardening a copper powder packed in the hole 44 by means of a liquid adhesive agent. Each of the conductors constituting the good conductive portion 43 is composed of a material, e.g., a copper wire or a copper powder formed into a line, having an electric resistivity lower than that of the material for the brush main portion 42. Each conductor extends along the main current direction in the brush main portion 42.

In this embodiment, the brush 41 is formed in the following manner. A thin layer composed of carbon particles with a synthetic resin binder is prepared first on a base. A plurality (about three or four) of conductors constituted by copper wires or lines formed of a copper powder are arranged on the thin carbon layer so as to be separated from each other. A thin lay composed of carbon particles with a synthetic resin binder is further formed on the above described carbon layer with conductors. After this process is repeated several times, the multi-layered structure is then compressed into a square-bar shape. Finally, the square-bar shaped multi layered carbon is sintered. That is, the brush main portion 42 and the good conductive portion 43 constituting the brush 41 are simultaneously formed. In this embodiment, copper wires or lines composed of a copper powder are used as the conductors constituting the good conductive portion 43. However, a plurality of thin plate shaped conductors may be used. In addition, a plurality of conductors may be formed by arranging a copper powder to form a plurality of lines along the main current direction on one carbon layer, repeating this process, and pressing the multi layered carbon, together with a plurality of carbon powder lines.

In the brush 41, the commutator-side end surfaces of the plurality of conductors of the good conductive portion 43 embedded in the brush main portion 42 may be exposed in the commutator-side end surface 42*a* of the brush main portion 42 or covered by the commutator-side end surface 42*a* in the initial stage of use of the brush 41. Furthermore, the linear shaped conductors or thin plate shaped conductors of the good conductive portion 43 can have arbitrary lengths as long as they are embedded in the brush main portion 42 to extend along the current direction through the total length of the wearing portion the the brush main portion 42 (corresponding to an effective length A).

The arrangement of the ninth embodiment is the same as that of the first embodiment except for the structure described above. Therefore, the same reference numerals in the ninth embodiment denote the same structural members as in the first embodiment, and a description thereof will be omitted. In the ninth embodiment, the objects of the present invention can be achieved by the same function as that of the first embodiment.

The effects obtained by the unique structure of the ninth embodiment will be described next.

In this embodiment, since the brush main portion 42 and the good conductive portion 43, both constituting the brush 41, are simultaneously formed, the manufacturing process of the brush 41 is simplified. In addition, since the conductors of the good conductive portion 43 are dispersed and embedded in the brush main portion 42, the heat radiating characteristic of the brush 41 is improved. Furthermore, since each of the conductors of the good conductive portion 43 is slender, each conductor is firmly held in the brush main portion 42. Therefore, even if each conductor is composed of a copper powder, it does not fall out from the brush main portion 42 while the motor brush 41 is used.

Figure 22:
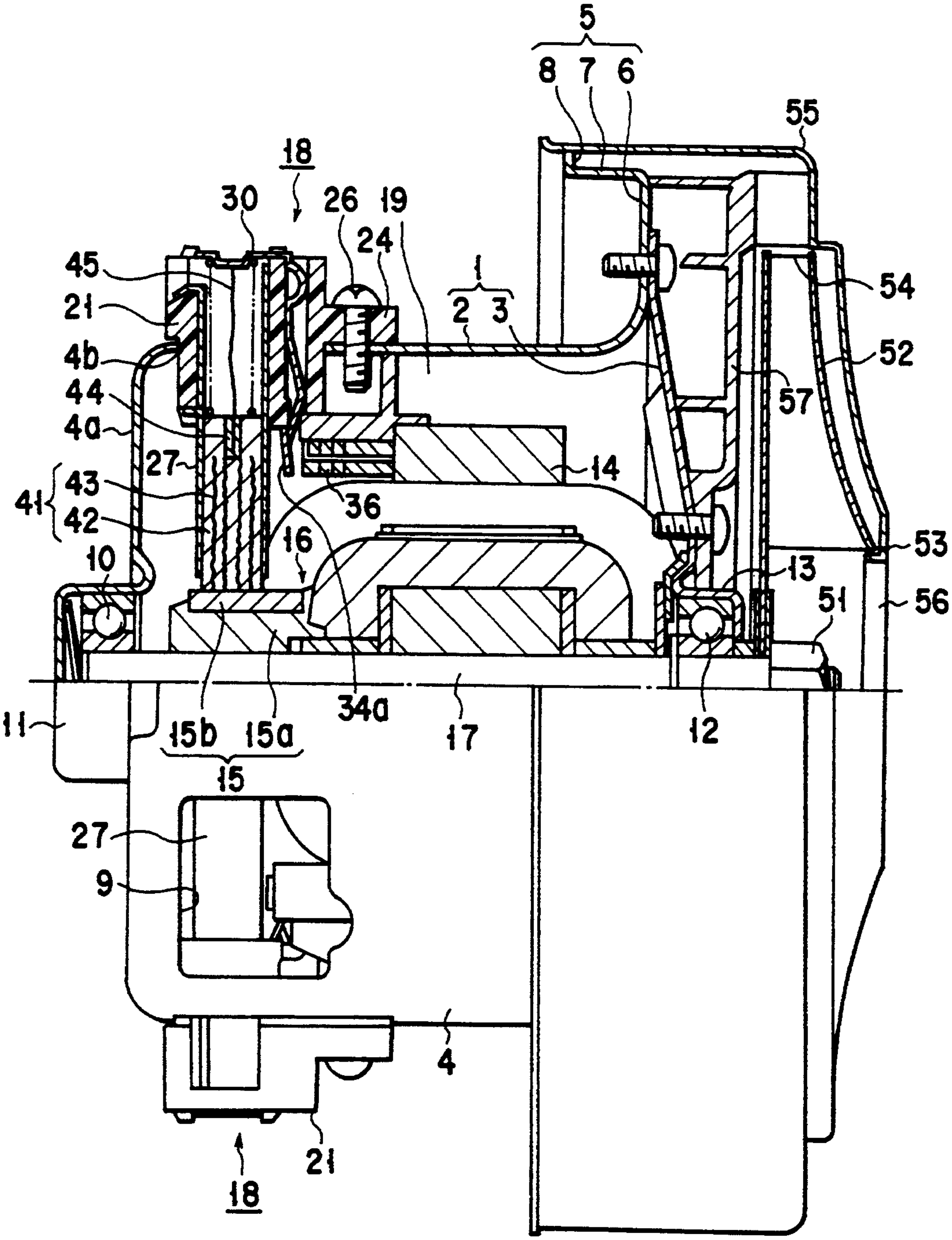
FIG. 22 is a half cutaway side view showing an air blower in which the commutator motor including the brush device of FIG. 20 is installed.

FIG. 22 shows a commutator motor installed in an air blower, and the commutator motor has the brush device 18 using the brush 41 according to the ninth embodiment of the present invention described above. These commutator motor and air blower have the same structures as those using the motor brush 41 of the first embodiment. Therefore, the same reference numerals denote the same structural members as in the first embodiment, and a detailed description thereof will be omitted.

Tenth Embodiment

Figure 23:
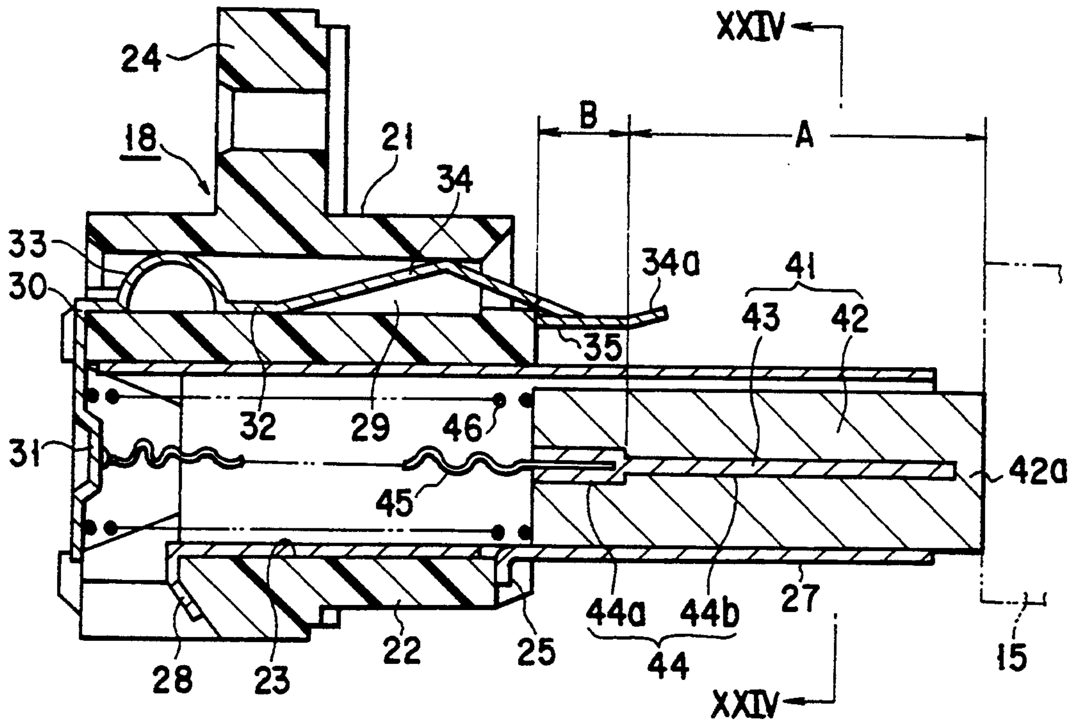
FIG. 23 is a longitudinal sectional view showing a brush device holding a brush according to the tenth embodiment of the present invention.
Figure 24:
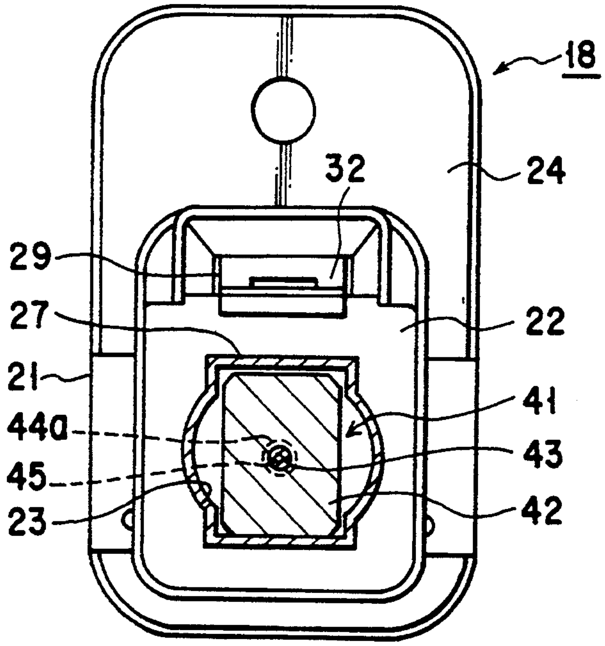
FIG. 24 is a sectional view taken along a line XXIV—XXIV in FIG. 23.

A brush device using a brush according to the tenth embodiment of the present invention will be described below with reference to FIGS. 23 and 24.

In this embodiment, the hole 44 formed in the center of the brush 41 is constituted by the embedding portion 44*a* open in the proximal end surface of the brush main portion 42, and the hole main portion 44*b* extending from the embedding portion 44*a* toward the commutator-side end portion of the brush main portion 42. Both the embedding portion 44*a* and the hole main portion 44*b* have circular cross-sections. The cross-sectional area of the hole main portion 44*b* is smaller than that of the embedding portion 44*a*. Therefore, the hole 44 is a stepped hole.

Since one end portion of the pigtail 45 is embedded in and fixed to the embedding portion 44*a*, the embedding portion 44*a* has a length B being about 1.2 times as large as the depth in which one end portion of the pigtail 45 is embedded, and has a diameter (e.g., 2.5 mm) being about three times as large as that (e.g., 0.8 mm) of the pigtail 45. The hole main portion 44*b* has a diameter (e.g., 1.5 mm) being about 1.2 to 2 times as large as that of the pigtail 45. The commutator-side end of the hole main portion 44*b* is covered by the commutator-side end surface 42*a* of the brush main portion 42.

The good conductive portion 43 is formed by packing a material, e.g., a copper powder, having an electric resistivity lower than that of the material for the brush main portion 42 into the hole 44, and stamping it to be hardened.

One end portion of the pigtail 45 is inserted into the embedding portion 44*a* and is fixed therein by hardening the copper powder packed around the pigtail 45 in the embedding portion 44*a* by means of a liquid adhesive agent.

The arrangement of the tenth embodiment is the same as that of the first embodiment except for the structure described above. Therefore, the same reference numerals in the tenth embodiment denote the same structural members as in the first embodiment, and a detailed description thereof will be omitted. In the tenth embodiment, the objects of the present invention can be achieved by the same function as that of the first embodiment.

The effects obtained by the unique structure of the tenth embodiment will be described next.

In this embodiment, since the cross-sectional area of the good conductive portion 43 is smaller than that of the embedding portion 44*a*, the thickness of the brush main portion 42 is increased inevitably resulting in an increase in strength of the brush main portion 42. In addition, since the thickness of the good conductive portion 43, which generates heat when a current flows, is decreased relative to an increase in the thickness of the brush main portion 42, the amount of heat generated by the good conductive portion 43 is relatively small. Therefore, the force based on the thermal expansion of the good conductive portion 43 and acting on the brush main portion 42 can be reduced.

As described above, the brush main portion 42 has a high strength, and the thermal expansion force produced by the good conductive portion 43 in the brush main portion 42 and acting on the brush main portion 42 is relatively small. These two factors greatly reduce the possibility that the brush main portion 42 is damaged by the difference in thermal expansions between the brush main portion 42 and the good conductive portion 43.

In addition, since the cross-sectional area of the good conductive portion 43 is larger than that of the pigtail 45, the current density in the good conductive portion 43 becomes higher than that in the pigtail 45. This makes a current tend to flow in the good conductive portion 43. Consequently, in spite of the fact that the good conductive portion 43 is smaller in the diameter than the embedding portion 44*a*, the resistance loss of by the current in the good conductive portion 43 is small, and the amount of heat generated thereby is small. Therefore, the possibility of damaging the brush main portion 42 by the thermal expansion of the good conductive portion 43 is reliably eliminated.

Figure 25:
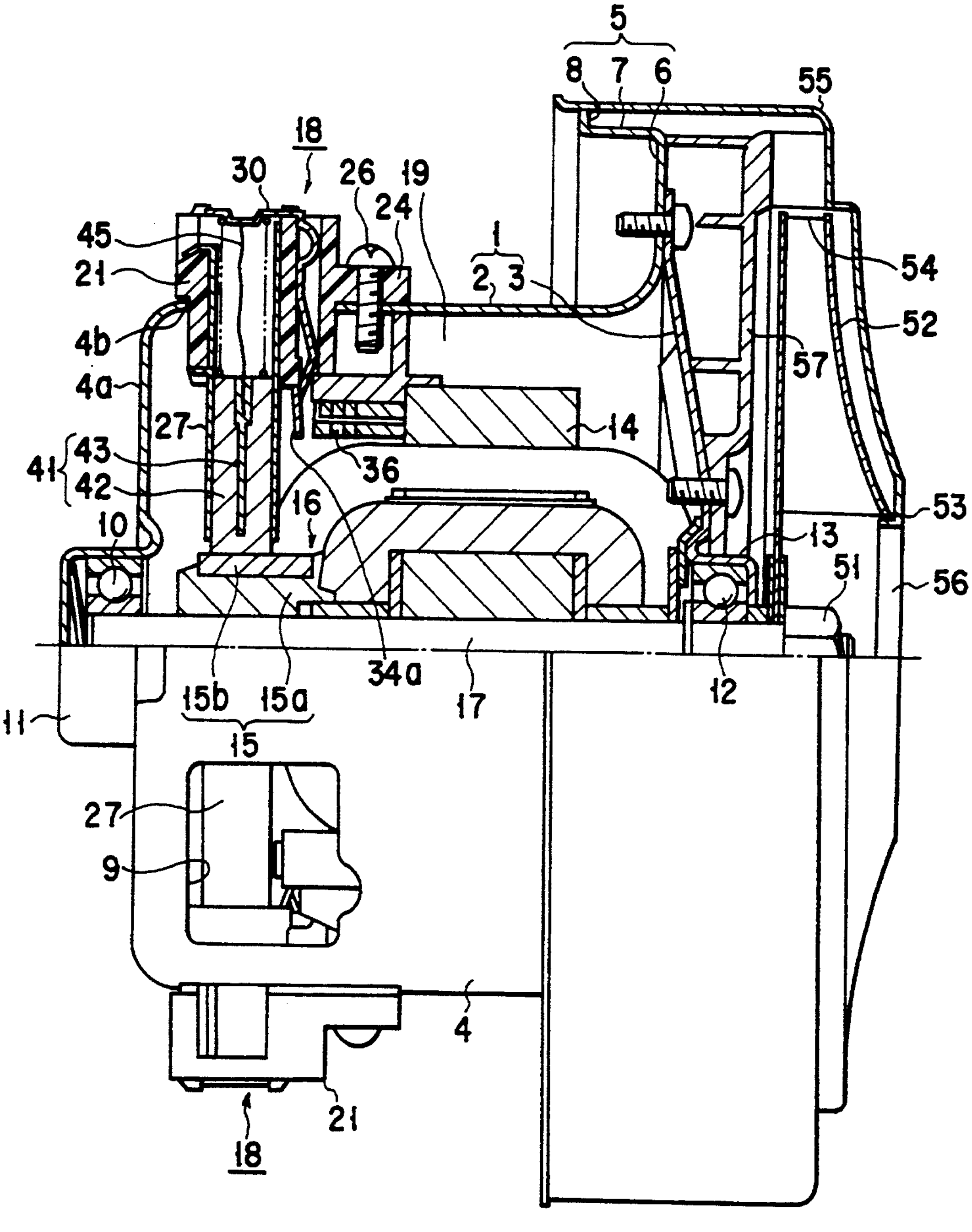
FIG. 25 is a half cutaway side view showing an air flower in which the commutator motor including the brush device of FIG. 23 is installed.

FIG. 25 shows a commutator motor installed in an air blower, and the commutator motor has the brush device 18 using the brush 41 according to the tenth embodiment of the present invention described above. These commutator motor and air blower have the same structures as those using the brush 41 of the first embodiment. Therefore, the same reference numerals denote the same structural members as in the first embodiment, and a detailed description thereof will be omitted.

Eleventh Embodiment

Figure 26:
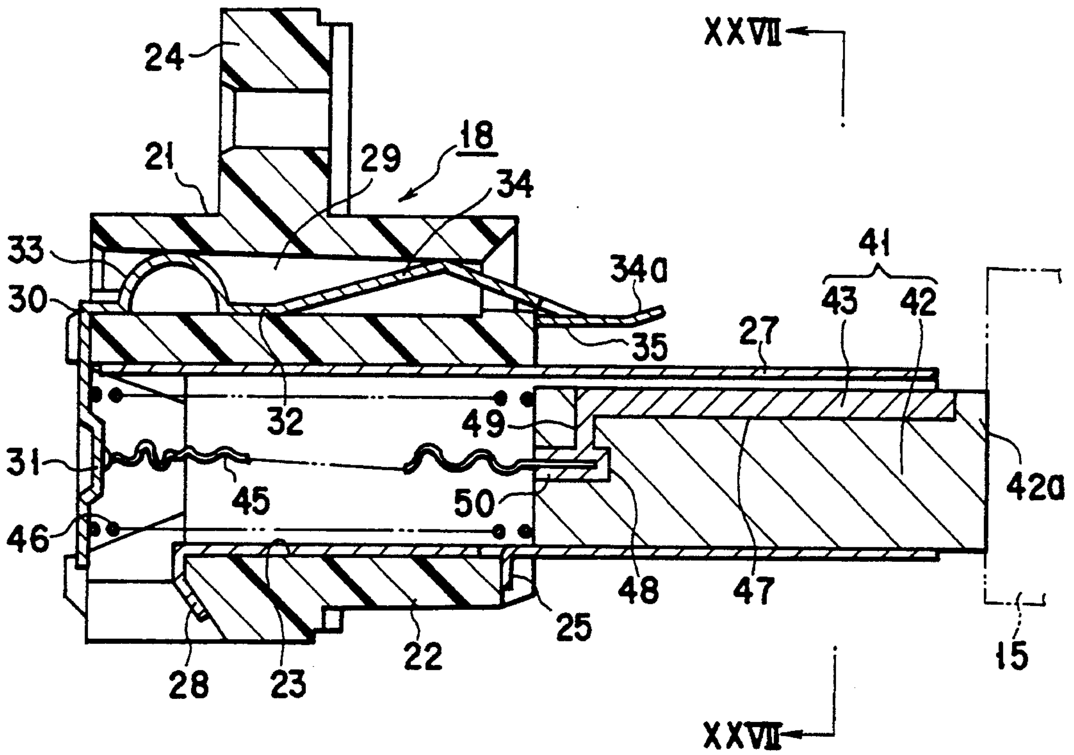
FIG. 26 is a longitudinal sectional view showing a brush device holding a brush according to the eleventh embodiment of the present invention.
Figure 27:
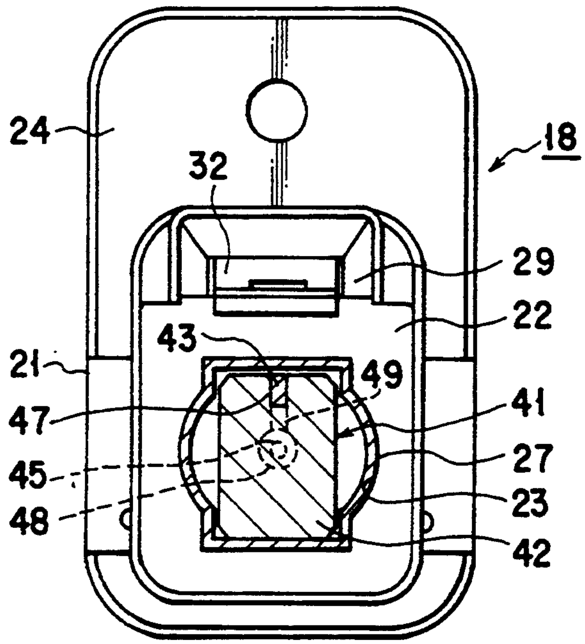
FIG. 27 is a sectional view taken along a line XXVII—XXVII in FIG. 26.

FIGS. 26 and 27 show the eleventh embodiment of the present invention. In this embodiment, the groove 47 open only in a side surface of the brush main portion 42 extends along the main current direction of the brush main portion 42. The good conductive portion 43 is composed of a copper powder packed and hardened in the groove 47. Referring to FIG. 26, reference numeral 48 denotes an embedding portion formed in the proximal end surface of the brush main portion 42 and designed for the connection of one end portion of the pigtail 45. In this embodiment, the embedding portion 48 communicates with the groove 47 through a communicating groove 49. A copper powder is packed and hardened in the embedding portion 48 and in the communicating groove 49, while one end portion of the pigtail 45 is embedded in the embedding portion 48. The cross-sectional area of the good conductive portion 43 is smaller than that of the embedding portion 48.

The arrangement of the eleventh embodiment is the same as that of the first embodiment except for the structure described above. Therefore, the same reference numerals in the eleventh embodiment denote the same structural members as in the first embodiment, and a description thereof will be omitted. In the eleventh embodiment, the objects of the present invention can be achieved by the same function as that of the first embodiment.

In addition, the effects obtained by the unique structure of the eleventh embodiment are the same as those obtained in the tenth embodiment.

Figure 28:
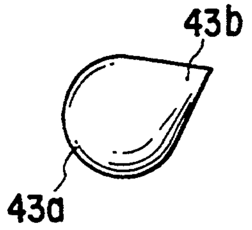
FIG. 28 is a view showing a powder particle of an electric good conductive material for good conductive portions of the brushes according to various embodiments of the present invention.
Figure 29:
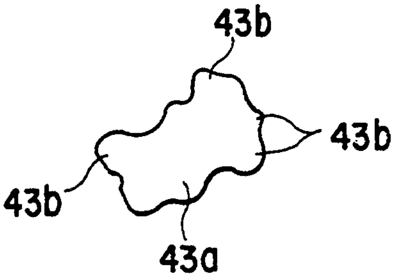
FIG. 29 is a view showing another powder particle for the same.
Figure 30:
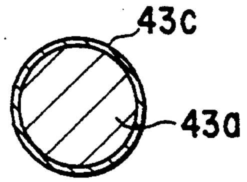
FIG. 30 is a sectional view showing still another powder particle for the same.

FIGS. 28 to 30 show various examples of the powder particles of the good conductive materials for the good conductive portions 43 of the brushes 41 of the various embodiments described above.

VARIOUS EXAMPLES OF GOOD CONDUCTIVE MATERIALS

FIG. 28 shows a spherical powder particle body 43*a* having one projection 43*b* formed on its outer surface. The projection 43*b* tapers and is deformable when the good conductive portion 43 is thermally expanded and the powder particles constituting the good conductive portion 43 are pressed.

FIG. 29 shows another powder particle body 43*a* having a plurality of projections 43*b* formed on its outer surface.

Since each particle body 43*a* has at least one projection 43*b*, even if the conductive powder composed of the powder particle bodies 43*a* are packed and hardened in the hole 44 to form the good conductive portion 43, the powder particle bodies 43*a* are not easily packed at a very high density, so that minute gaps caused by heat generated by the good conductive portion 43, are easily produced between the adjacent powder particle bodies 43*a* to allow the thermal expansion of each powder particle body 43*a*. Moreover, when each powder particle body 43*a* expands, its expansion force crushes or bend to deform the projection or projections 43*b* of the adjacent powder particle body 43*a*. In this manner, the thermal expansion energy produced in the good conductive portion 43 by the heat generation of the good conductive portion 43 can be absorbed in the good conductive portion 43, thus reducing the internal pressure (the expansion force of the good conductive portion 43) acting on the brush main portion 42 upon thermal expansion of the good conductive portion 43. This prevents damage of the brush main portion 42 based on the difference in the thermal expansion between the brush main portion 42 and the good conductive portion 43.

FIG. 30 shows a spherical copper powder particle body 43*a* whose surface is plated with a noble metal, having an electric conductivity higher than that of copper, to form a plating layer 43*c*. As the noble metal, gold, silver or the like is used. When the powder particle bodies 43*a*, each covered with the plating layer 43*c*, are stamped and hardened, their plating layers 432*c* are in tight contact with each other, so that the electric conductivity of the good conductive portion 43 is improved. For this reason, the total resistance of the brush 41 is further reduced, and heat generated by the good conductive portion 43 is suppressed. Therefore, the thermal expansion of the good conductive portion 43 is suppressed to reduce the internal pressure based on the thermal expansion of the good conductive portion 43 and acting on the brush main portion 42. This prevents damage of the brush main portion 42 based on the difference in the thermal expansion between the brush main portion 42 and the good conductive portion 43.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A brush having a portion which wears upon making contact with a commutator, almost all of the portion comprising at least two types of materials having different electric resistivities, and extending along a main current direction, comprising:

a good conductive portion includes an electric conductive powder made of a first one of said materials having a lowest electric resistivity, and extending along the main current direction of said brush; and a brush main portion made of a second one of said materials having a resistivity higher than that of said good conductive portion, and extending along the main current direction of said brush, said brush main portion having a widthwise dimension larger than a respective widthwise dimension of said good conductive portion, as measured in a cross section of said brush perpendicular to said main current direction, said brush main portion having a hole extending along the main current direction, and said good conductive portion made of said electric conductive powder being embedded in the hole, and said brush main portion having a commutator-side end surface, and a lead line made of a material having an electric resistivity lower than that of said second one of said materials for said brush main portion, and inserted into and embedded in a proximal end portion of said good conductive portion opposite to the commutator-side end surface thereof.

2. A brush according to claim 1, wherein a commutator-side end portion of said good conductive portion is covered by said brush main portion in an initial stage of use of said brush.

3. A brush according to claim 1, wherein said good conductive portion comprises the electric conductive powder solidified in a form of a rod which is embedded in the hole.

4. A brush according to claim 1, wherein said commutator-side end surface of said good conductive portion is exposed at the commutator-side end surface of said brush main portion.

5. A brush according to claim 1, further including resistance means having an electric resistivity higher than that of the second one of said materials for said brush main portion mounted in the commutator-side end surface of said brush main portion between the commutator-side end surface of said brush main portion and a commutator-side end surface of said good conductive portion in an initial stage of use of said brush, a cross-sectional area of said resistance means which is perpendicular to the main current direction being at least as large as a cross-sectional area of the commutator-side end portion of said good conductive portion which is perpendicular to the main current direction, and said resistance means covers the commutator-side end surface of said good conductive portion.

6. A brush according to claim 5, wherein said resistance means is constituted by an air gap.

7. A brush according to claim 6, wherein said good conductive portion comprises an electric conductive powder embedded in the hole.

8. A brush according to claim 1, wherein:

the hole of said brush main portion is tapered, the hole extending along the main current direction and tapering toward the commutator-side end surface of said brush main portion, and said good conductive portion comprises an electric conductive powder embedded in the tapered hole.

9. A brush according to claim 8, wherein the commutator-side end portion of said good conductive portion is covered by said brush main portion in an initial stage of use of said brush.

10. A brush according to claim 1, wherein said lead line extends toward the commutator-side end surface along the main current direction.

11. A brush according to claim 10, wherein said lead line is formed by combining a plurality of electric conductive lines together.

12. A brush according to claim 1, wherein the hole in a proximal end surface of said brush main portion extends to a commutator-side end of said lead line along said lead line.

13. A brush according to claim 1, wherein:

said good conductive portion includes a plurality of elongated conductors made of a material having an electric resistivity lower than that of the second one of said materials for said brush main portion, and said elongated conductors extend along the main current direction while said conductors are dispersed in said brush main portion.

14. A brush according to claim 13, wherein each of said elongated conductors is formed by a powder having an electric resistivity lower than that of said brush main portion, and said brush main portion is formed by forming a powder having an electric resistivity higher than that of said good conductive portion into a predetermined shape.

15. A brush according to claim 13, wherein commutator-side end portions of said elongated conductors of said good conductive portion are exposed in the commutator-side end surface of said brush main portion.

16. A brush according to claim 1, wherein:

a proximal end portion of said good conductive portion which is opposite to a commutator-side end portion thereof is continuous with the conductive powder in the hole, and the cross-sectional area of said good conductive portion is smaller than that of the hole in the proximal end surface of said brush main portion.

17. A brush according to claim 16, wherein a cross-sectional area of said good conductive portion is larger than that of said lead line.

18. A brush according to claim 1, wherein the first one of said materials having the lowest electric resistivity includes a powder particle having at least one projection which can be deformed upon thermal expansion of said god conductive portion.

19. A brush according to claim 1, wherein the first one of said materials having the lowest electric resistivity includes a powder particle having an outer surface plated with a noble metal.

20. A commutator motor, comprising:

a stator;

a motor case containing said stator;

a rotor having a rotor shaft and a commutator fixed to said rotor shaft, said rotor being arranged inside said stator in said motor case and being rotatably supported by said motor case; and a brush device having a brush which is brought into contact with said commutator of said rotor and is supported by said motor case, almost all of a portion of said brush, which wears upon making contact with said commutator, comprising at least two types of materials having different electric resistivities, and extending along a main current direction of said brush, wherein said brush includes:

a good conductive portion includes an electric conductive powder made of a first one of said materials having a lowest electric resistivity, and a brush main portion made of a second one of said materials having an electrical resistivity higher than that of said good conductive portion, said brush main portion having a widthwise dimension larger than a respective widthwise dimension of said good conductive portion, as measured in a cross section of said brush perpendicular to said main current direction, said brush main portion having a hole extending along the main current direction, and said good conductive portion made of said electric conductive powder being embedded in the hole, and said brush main portion having a commutator-side end surface, and includes a lead line made of a material having an electric resistivity lower than that of said second one of said materials for said brush main portion, and inserted into and embedded in a proximal end of said good conductive portion opposite to the commutator-side end surface thereof.

21. A commutator motor, comprising:

a stator;

a motor case containing said stator;

a rotor having a rotor shaft and a commutator fixed to said rotor shaft, said rotor being arranged inside said stator in said motor case and being rotatably supported by said motor case; and a brush device having a brush which is brought into contact with said commutator of said rotor and is supported by said motor case, almost all of a portion of said brush, which wears upon making contact with said commutator, comprising at least two types of materials having different electric resistivities, and extending along a main current direction of said brush, wherein said brush includes:

a good conductive portion includes an electric conductive powder made of a first one of said materials having a lowest electric resistivity, and a brush main portion made of a second one of said materials having an electrical resistivity higher than that of said good conductive portion, said brush main portion having a widthwise dimension larger than a respective widthwise dimension of said good conductive portion, as measured in a cross section of said brush perpendicular to said main current direction, said brush main portion having a hole extending along the main current direction, and said good conductive portion made of said electric conductive powder being embedded in the hole, and said brush main portion having a commutator-side end surface, includes a lead line made of a material having an electric resistivity lower than that of said second one of said materials for said brush main portion, and inserted into and embedded in a proximal end of said good conductive portion opposite to the commutator-side end surface thereof, resistance means comprises an air gap to have an electric resistivity higher than that of the second one of said materials for said brush main portion mounted in the commutator-side end surface of said brush main portion between the commutator-side end surface of said brush main portion and a commutator-side end surface of said good conductive portion in an initial stage of use of said brush, a cross-sectional area of said resistance means which is perpendicular to the main current direction is at least as large as a cross-sectional area of the commutator-side end portion of said good conductive portion which is perpendicular to the main current direction, and said resistance means covers the commutator-side end surface of said good conductive portion.

22. A commutator motor, comprising:

a stator;

a motor case containing said stator;

a rotor having a rotor shaft and a commutator fixed to said rotor shaft, said rotor being arranged inside said stator in said motor case and being rotatably supported by said motor case; and a brush device having a brush which is brought into contact with said commutator of said rotor and is supported by said motor case, almost all of a portion of said brush, which wears upon making contact with said commutator, comprising at least two types of materials having different electric resistivities, and extending along a main current direction of said brush, wherein said brush includes:

a good conductive portion includes an electric conductive powder made of a first one of said materials having a lowest electric resistivity, and a brush main portion made of a second one of said materials having an electrical resistivity higher than that of said good conductive portion, said brush main portion having a widthwise dimension larger than a respective widthwise dimension of said good conductive portion, as measured in a cross section of said brush perpendicular to said main current direction, said brush main portion having a hole extending along the main current direction, and said good conductive portion made of said electric conductive powder being embedded in the hole, and said brush main portion having a commutator-side end surface, and a lead line made of a material having an electric resistivity lower than that of said second one of said materials for said brush main portion, and inserted into and embedded in a proximal end portion of said good conductive portion opposite to the commutator-side end surface thereof, said good conductive portion includes a plurality of elongated conductors having an electric resistivity lower than that of the second one of said materials for said brush main portion, and said elongated conductors extend along the main current direction while said conductors are dispersed in said brush main portion.

23. A commutator motor, comprising:

a stator;

a motor case containing said stator;

a rotor having a rotor shaft and a commutator fixed to said rotor shaft, said rotor being arranged inside said stator in said motor case and being rotatably supported by said motor case; and a brush device having a brush which is brought into contact with said commutator of said rotor and is supported by said motor case, almost all of a portion of said brush, which wears upon making contact with said commutator, comprising at least two types of materials having different electric resistivities, and extending along a main current direction of said brush, wherein said brush includes:

a good conductive portion includes an electric conductive powder made of a first one of said materials having a lowest electric resistivity, and a brush main portion made of a second one of said materials having an electrical resistivity higher than that of said good conductive portion, said brush main portion having a widthwise dimension larger than a respective widthwise dimension of said good conductive portion, as measured in a cross section of said brush perpendicular to the main current direction, said brush main portion having a commutator-side end surface, said brush main portion having a hole extending along the main current direction and formed in a proximal end surface of said brush main portion which is opposite to the commutator-side end surface thereof, and said good conductive portion made of said electric conductive powder being embedded in the hole, and a lead line made of a material having an electric resistivity lower than that of said second one of said materials for said brush main portion, and inserted into and embedded in a proximal end portion of said good conductive portion opposite to the commutator-side end surface thereof, said good conductive portion includes an electric conductive powder having an electric resistivity lower than that of the second one of said materials for said brush main portion embedded in the hole of said brush main portion, a proximal end portion of said good conductive portion which is opposite to the commutator-side end portion hereof is continuous with the conductive powder in the hole, and and the cross-sectional area of said good conductive portion is smaller than that of the hole in the proximal end surface of said brush main portion.

24. A commutator motor, comprising:

a stator;

a motor case containing said stator;

a rotor having a rotor shaft and a commutator fixed to said rotor shaft, said rotor being arranged inside said stator in said motor case and being rotatably supported by said motor case; and a brush device having a brush which is brought into contact with said commutator of said rotor and is supported by said motor case, almost all of a portion of said brush, which wears upon making contact with said commutator, comprising at least two types of materials having different electric resistivities, and extending along a main current direction of said brush, wherein said brush includes:

a good conductive portion includes an electric conductive powder made of a first one of said materials having a lowest electric resistivity, and a brush main portion made of a second one of said materials having an electrical resistivity higher than that of said good conductive portion, said brush main portion having a widthwise dimension larger than a respective widthwise dimension of said good conductive portion, as measured in a cross section of said brush perpendicular to said main current direction, said brush main portion having a hole extending along the main current direction, and said good conductive portion being embedded in the hole, and said brush main portion made of said electric conductive powder having a commutator-side end surface, and a lead line made of a material having an electric resistivity lower than that of said second one of said materials for said brush main portion, and inserted into and embedded in a proximal end portion of said good conductive portion opposite to the commutator-side end surface thereof, and the first one of said materials having the lowest electric resistivity includes a power particle having at least one projection which can be deformed upon thermal expansion of said good conductive portion.

25. A commutator motor, comprising:

a stator;

a motor case containing said stator;

a rotor having a rotor shaft and a commutator fixed to said rotor shaft, said rotor being arranged inside said stator in said motor case and being rotatably supported by said motor case; and a brush device having a brush which is brought into contact with said commutator of said rotor and is supported by said motor case, almost all of a portion of said brush, which wears upon making contact with said commutator, comprising at least two types of materials having different electric resistivities, and extending along a main current direction of said brush, wherein said brush includes:

a good conductive portion includes an electric conductive powder made of a first one of said materials having a lowest electric resistivity, and a brush main portion made of a second one of said materials having an electrical resistivity higher than that of said good conductive portion, said brush main portion having a widthwise dimension larger than a respective widthwise dimension of said good conductive portion, as measured in a cross section of said brush perpendicular to said main current direction, said brush main portion having a hole extending along the main current direction, and said good conductive portion made of said electric conductive powder being embedded in the hole, and said brush main portion having a commutator-side end surface, and a lead line made of a material having an electric resistivity lower than that of said second one of said materials for said brush main portion, and inserted into and embedded in a proximal end portion of said good conductive portion opposite to the commutator-side end surface thereof, and the first one of said materials having the lowest electric resistivity includes a power particle having a surface plated with a noble metal.

* * * * *